(12) United States Patent
Rising, III et al.

(10) Patent No.: US 7,398,275 B2
(45) Date of Patent: Jul. 8, 2008

(54) EFFICIENT BINARY CODING SCHEME FOR MULTIMEDIA CONTENT DESCRIPTIONS

(75) Inventors: Hawley K. Rising, III, San Jose, CA (US); Ali Tabatabai, Beaverton, OR (US); Mohammed Z. Visharam, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 890 days.

(21) Appl. No.: 10/029,758

(22) Filed: Oct. 22, 2001

(65) Prior Publication Data

US 2002/0138514 A1    Sep. 26, 2002

Related U.S. Application Data

(60) Provisional application No. 60/269,766, filed on Feb. 16, 2001, provisional application No. 60/260,911, filed on Jan. 10, 2001, provisional application No. 60/241,938, filed on Oct. 21, 2000, provisional application No. 60/241,987, filed on Oct. 20, 2000.

(51) Int. Cl.
*G06F 7/00* (2006.01)

(52) U.S. Cl. .................................. 707/101

(58) Field of Classification Search .............. None
See application file for complete search history.

(56) References Cited

U.S. PATENT DOCUMENTS

| | | | |
|---|---|---|---|
| 5,325,449 A | 6/1994 | Burt et al. | |
| 5,495,292 A | 2/1996 | Zhang et al. | |
| 5,579,471 A | 11/1996 | Barber et al. | |
| 6,236,395 B1 | 5/2001 | Sezan et al. | |
| 6,345,279 B1 | 2/2002 | Li et al. | |
| 6,411,724 B1 | 6/2002 | Vaithilingam et al. | |
| 6,490,320 B1 | 12/2002 | Vetro et al. | |
| 6,490,370 B1 | 12/2002 | Krasinski et al. | |
| 6,492,998 B1 | 12/2002 | Kim et al. | |
| 6,564,263 B1 | 5/2003 | Bergman et al. | |

(Continued)

OTHER PUBLICATIONS

Hu, et al., "Multimedia Description Framework (MDF) for Content Description of Audio/Video Documents", School of EEE, Nanyang Technological University, 1999, pp. 67-75.

(Continued)

*Primary Examiner*—Apu Mofiz
*Assistant Examiner*—Kavita Padmanabhan
(74) *Attorney, Agent, or Firm*—Blakely, Sokoloff, Taylor & Zafman LLP

(57) ABSTRACT

An encoding methodology encodes an instance document describing multimedia content by determining a context node in the content description and using a schema associated with the context node to determine the maximum number of children attributes and elements of the context node. Values for required attributes and elements are encoded into required attributes and required elements sections, respectively. Values for each optional attribute and optional element present in the content description are encoded into corresponding optional attributes and optional elements sections. In one aspect, a mask is encoded that indicates which of the optional attributes or optional elements are present in the content description. In another aspect, a count of the optional attributes or optional elements is used in place of the mask. A corresponding decode methodology extracts the values of the attributes and elements from the encoded instance document to re-create the content description.

108 Claims, 18 Drawing Sheets

U.S. PATENT DOCUMENTS

| | | |
|---|---|---|
| 6,593,936 B1 | 7/2003 | Huang et al. |
| 6,646,676 B1 | 11/2003 | DaGraca et al. |
| 6,748,382 B1 | 6/2004 | Mohan et al. |
| 6,751,623 B1 | 6/2004 | Basso et al. |
| 6,772,180 B1 * | 8/2004 | Li et al. .................. 715/513 |
| 6,847,980 B1 | 1/2005 | Benitez et al. |
| 6,883,137 B1 * | 4/2005 | Girardot et al. ............ 715/513 |
| 6,901,431 B1 * | 5/2005 | Dodrill et al. .............. 709/207 |
| 6,904,562 B1 * | 6/2005 | Hind et al. ................. 715/515 |
| 6,966,027 B1 | 11/2005 | Krasinski |
| 6,995,765 B2 | 2/2006 | Boudier |
| 7,143,434 B1 | 11/2006 | Paek et al. |
| 7,185,049 B1 | 2/2007 | Benitez et al. |
| 2002/0157112 A1 | 10/2002 | Kuhn |
| 2003/0093790 A1 | 5/2003 | Logan et al. |

OTHER PUBLICATIONS

Eric Rehm, "Representing Internet Streaming Media Metadata Using MPEG-7 Multimedia Descriptions Schemes", Singingfish.com, 2000, pp. 93-98.

Villard, et al., "An XML-Based Multimedia Document Processing Model for Content Adaption", Sep. 14, 2000, 12 pgs.

International Organization for Standardization, ISO/IEC JTC1/SC29/WG11, N3575, MPEG 00/N3575, Jul. 2000 (Beijing), 16 pgs.

Amielh, et al., "Bitstream Syntax Description Language" Application of XML-Schema to Multimedia Content Adaptation, Philips Research France, 2002, 19 pgs.

* cited by examiner

250

| 251 | 1 | 1 | 0 | <Confidence> = 0.75 | <Reliability> = 0.5 | <Formation> = 000 |

253 — 255 — 257 — 259

| 261 | 0 | 0 | <Label> = Nature scenes | 0 — 267 |

263 — 265

| 271 | 1 | 1 | <DescriptorName> = ColorHistogram |

273 — 275

| 281 | 1 | 0 | 0 | 1 | <Confidence> = 1.0 | <Dimensions> = 2 |

283 — 285 — 287

| 291 | 1 | 0 | 0 | 0 | 0 | 1 | <Mean> = 0.5 | 1 | <Mean> = 0.5 | 0 | <Variance> = 0.25 | 1 | <Variance> = 0.75 | 0 | 277

EFFICIENT BINARY CODING SCHEME FOR MULTIMEDIA CONTENT DESCRIPTIONS

RELATED APPLICATIONS

The present application claims the benefit of U.S. Provisional Applications 60/241,987 filed Oct. 20, 2000, 60/241,938 filed Oct. 21, 2000, 60/260,911 filed Jan. 10, 2001 and 60/269,766 filed Feb. 16, 2001, which are hereby incorporated by reference.

FIELD OF THE INVENTION

This invention relates generally to encoding of multimedia content descriptions, and more particularly to encoding a binary representation of such content descriptions.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 2000, Sony Electronics, Inc., All Rights Reserved.

BACKGROUND OF THE INVENTION

Digital audiovisual information is becoming widely distributed through broadcast transmission, such as digital television signals, and interactive transmission, such as the Internet. The information may be in still images, audio feeds, or video data streams. The Moving Picture Experts Group (MPEG) has promulgated a Multimedia Content Description Interface standard, commonly referred to as MPEG-7, to standardize the description of audiovisual information when it is transmitted from a system that generates the information to a system that presents the information to a user.

An MPEG-7 description defines a generic structure for particular types of multimedia content. For example, the structure for a standard movie could include scenes, shots within scenes, titles for scenes, and time, color, shape, motion, and audio for shots. The corresponding description would contain a "descriptor" component that describes one of the features of the content, such as color, shape, motion, audio, title, etc., and a "description scheme" component that describe relationships among two or more descriptors, e.g., a shot description scheme that relates the features of a shot. A description scheme can also describe the relationship among other description schemes and between description schemes and descriptors, e.g., a scene description scheme that relates the different shots in a scene and relates the title of the scene to the shots.

A Schema is designed based on descriptors and description schemes used to describe the features of multimedia content, which is encoded into an instance document using a Description Definition Language(DDL). Each descriptor entry in the schema specifies the syntax and semantics of the corresponding feature. Each description scheme entry in the schema specifies the structure and semantics of the relationships among its children components. The DDL for MPEG-7 multimedia content descriptions is based on the XML (extensible markup language) standard. The descriptors, description schemes, semantics, syntax, and structures of the content description are coded as XML elements. XML attributes can be used to specify additional information about the elements. Some of the XML elements and attributes may be optional.

An instance of a content description, such as a particular movie, is specified in an XML "instance document" that references the appropriate schema and contains a set of "descriptor values" for the required elements and attributes in the schema and for any necessary optional elements and/or attributes. An instance document is typically encoded into a binary form for transmission between the system that generated the instance document and a system that will present the multimedia content and the descriptions described in the instance document.

The more complex the multimedia content descriptions, the larger the instance document and the longer the transmission time between the generating and presentation systems. While standard compression techniques can be employed to reduce the size of the instance document when it is converted into its binary form, such techniques do not reduce the amount of data sufficiently to enable practical transmission of large instance documents over slower connections.

SUMMARY OF THE INVENTION

An encoding methodology encodes an instance document describing multimedia content by determining a context node in the content description and using a schema associated with the context node to determine the maximum number of children attributes and elements of the context node. Values for required attributes and elements are encoded into required attributes and required elements sections, respectively. Values for each optional attribute and optional element present in the content description are encoded into corresponding optional attributes and optional elements sections. In one aspect, a mask is encoded that indicates which of the optional attributes or optional elements are present in the content description. In another aspect, identifiers for the optional attributes or optional elements are also encoded if their values appear in the content description in an order different than that defined in the schema and a count of the optional attributes or optional elements present is encoded instead of the mask. Additional fields are encoded to indicate special data types. A corresponding decode methodology extracts the values of the attributes and elements from the encoded instance document to re-create the content descriptions.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2A-B are diagrams of an exemplary schema and output of the embodiment of the invention of FIG. 1;

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
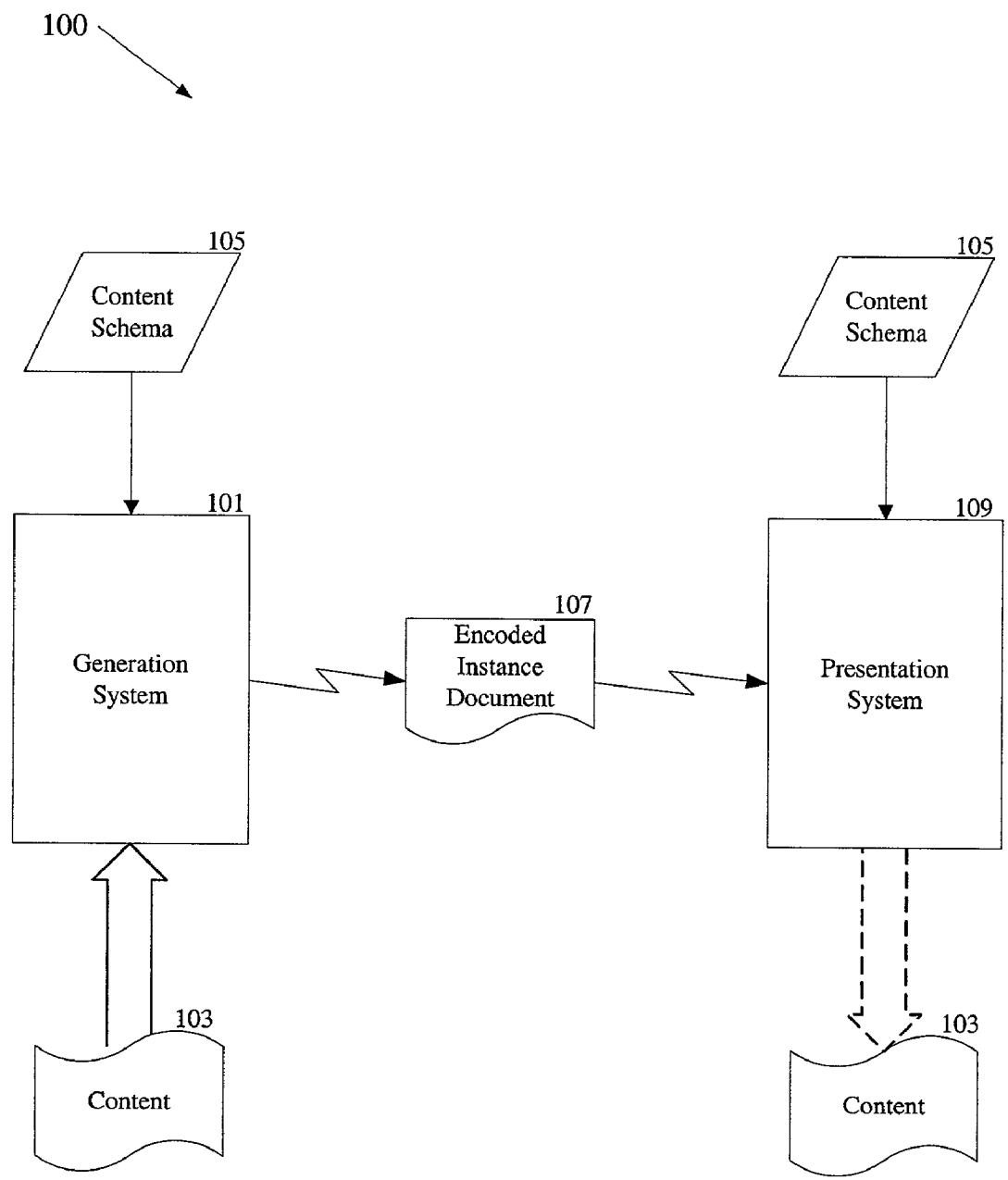
FIG. 1 is a diagram of a system-level overview of the operation of one embodiment of the invention.

A system level overview of the operation of an embodiment 100 of the invention is described by reference to FIG. 1. A generation system 101 creates an instance document describing multimedia content 103 with reference to a content schema 105 that describes the structure of the description of multimedia content 103 in terms of descriptors and description schemes. The generation system 101 encodes the instance document in accordance with an encoding methodology of the present invention and transmits the encoded instance document 107 to a presentation system 109. The presentation system 109 decodes the encoded instance document 107 with reference to a copy of the content schema 105. This could be used to re-create and present the multimedia content 103. The content schema 105 may be transmitted separately from the encoded instance document 107 from the generation system 101 to the presentation system 109, or it may be obtained by the presentation system 109 through another source. The encoded instance document 107 may be transmitted from the generation system 101 as a single transmission or may be transmitted as each section is encoded. It will be appreciated that the generation system 101 may directly encode the descriptions derived from the content into the encoded instance document 107 without first creating a separate instance document, or that the generation system 101 may receive an instance document from yet another system for encoding and transmission. Additionally, one of skill in the art will immediately recognize that the encoded instance document 107 can be stored on still another system that transmits the encoded instance document 107 to the presentation system 109 upon request.

One or more description schemes describing the multimedia content 103 are designated as "context nodes" within the content schema. The schema 105 may be a collection of separate context node schemas, each defining one of the context nodes in the multimedia content 103. The separate context node schemas enable the re-use of context node definitions to describe content of varying structures. The context node schema identifies the required and optional elements and attributes of the context node and the maximum number of its children elements and their attributes that may be present in an instance document.

A first embodiment of the encoding methodology of the present invention is grounded on two predicates. First, the schemas associated with the context nodes are designed such that the required elements and attributes appear first, followed by optional attributes and elements. Second, the schema order of the required and optional fields (elements and attributes) is preserved during the binarization of the instance document. An alternate second embodiment encodes instance documents in which the predicates cannot be met. Still a third embodiment is agnostic with regard to element and attribute ordering. In all embodiments, the encoding methodology relies on the information in the schema that defines the characteristics of the content being represented. The first embodiment of the encoding methodology is described with reference to FIGS. 2A and 2B.

Figure 2A:
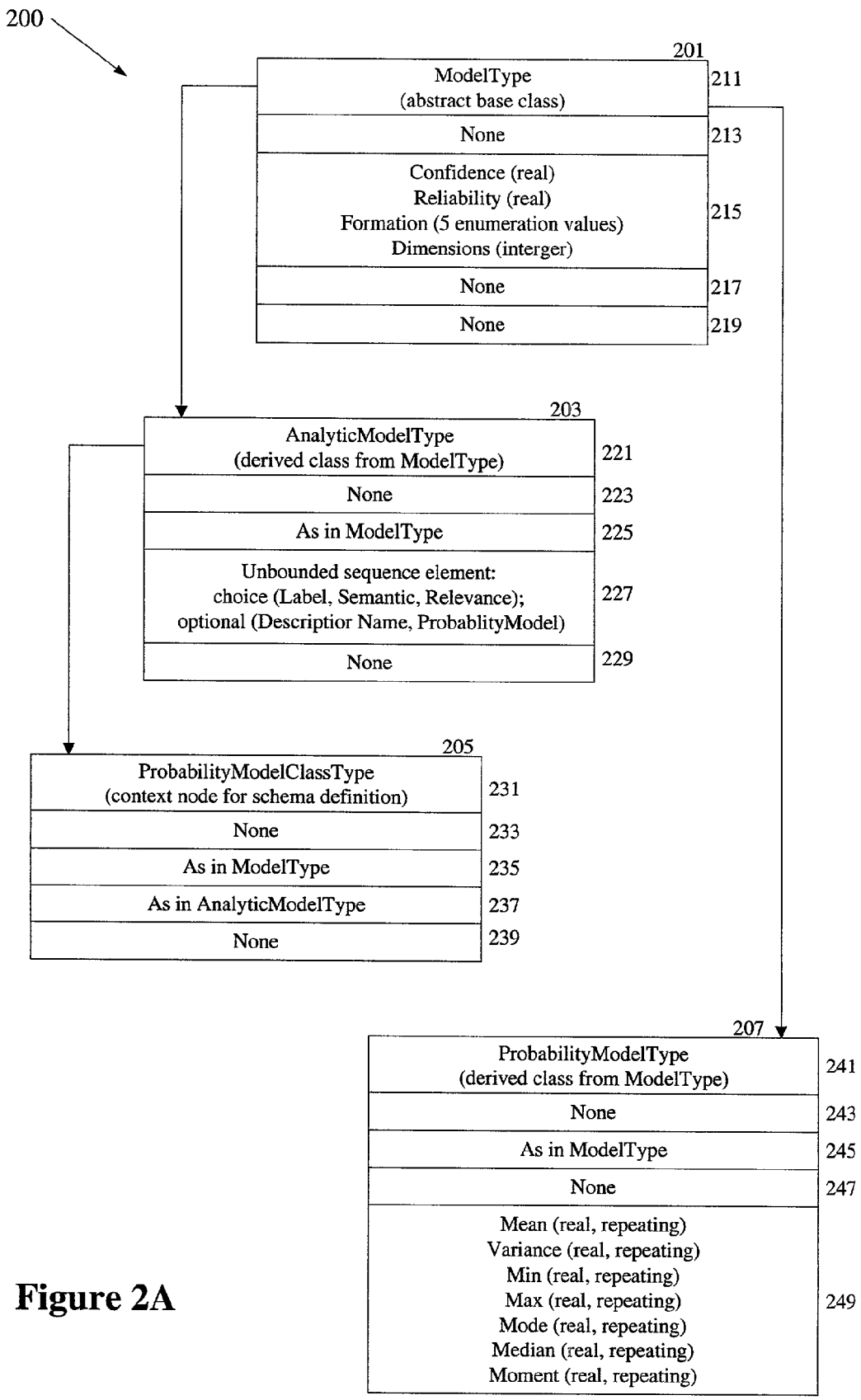

FIG. 2A illustrates an exemplary schema 200 that defines a class 205 for a ProbabilityModelClass context node. The ProbabilityModelClassType class 205 is derived from an AnalyticModelType class 203, which is in turn derived from a ModelType class 201 in the schema 200. Each of the classes define the number and characteristics of required and optional attributes and elements of the class. A class that is derived from another class inherits the attributes and elements of the parent class. Each class is identified by a field 211, 221, 231, 241 (illustrated in FIG. 2A containing the name of the class).

The ModelType class 201 shown in FIG. 2A has no required attributes 213 and four optional attributes 215, of which the Formation attribute has five enumeration values. The ModelType class 201 has no required 217 or optional 219 elements. The AnalyticModelType class 203 has no required attributes 223 and inherits its optional attributes 225 from the optional attributes 213 of its parent class 201. There is a single required element 227 in the AnalyticModelType class is an unbounded sequence consisting of 1) a choice among Label, Semantic, and/or Relevance element, and 2) optional DescriptorName and ProbabilityModel elements. Any combination of Label, Semantic, and Relevance values may be present in the instance document and may occur any number of times because the sequence is unbounded. There are no optional elements 229 defined for the AnalyticModelType class 203.

A ProbabilityModelType class 207 defines the ProbabilityModel element. The ProbabilityModelType class 207 is derived from the ModelType class 201 and thus inherits the optional attributes 215 as its optional attributes 245. It also defines seven optional elements, Mean, Variance, Mm, Max, Mode, Median, and Moment, which may have multiple values. The ProbabilityModelType class 207 contains no required attributes 243 or required elements 247.

Because the ProbabilityModelClassType class 205 is derived from the AnalyticModelType class 203, it inherits the optional attributes 215 from the ModelType class 201 and the required elements 227 from the AnalyticModelType class 237. Thus, the ProbabilityModelType class 207 defines a child element of the ProbabilityModelClass context node. The ProbabilityModelClassType class 205 contains no required attributes 233 nor optional elements 239.

Turning now to FIG. 2B, an encoded instance document 250 in accordance with the first embodiment of the present invention is described. The encoded instance document 250 corresponds to an exemplary instance document for a ProbabilityModelClass context node:

```
<ProbabilityModelClass confidence="0.75" reliability="0.5"
    formation="automatic">
        <Label>Nature scenes</Label>
        <DescriptorName>ColorHistogram</DescriptorName>
        <ProbabilityModel type="ProbabilityDistribution"
            confidence="1.0" dimensions="2">
            <Mean Size="2">0.5 0.5</Mean>
            <Variance Size="2">0.25 0.75</Variance>
        </ProbabilityModel>
</ProbabilityModelClass>
```

The encoding methodology begins by encoding the required attributes 233 of the ProbabilityModelClass context node. Because there are none, the encoding methodology next encodes the optional attributes 235 of the ProbabilityModelClass context node as shown in line 251 in FIG. 2B. A mask 253 is created that defines which of the four optional attributes 215 are present in the instance document. The size of the mask 253 in bits is equal to the maximum allowable number of optional attributes 215. Each bit within the mask 253 indicates if the corresponding optional attribute is present (1) or not (0). The mask 253 is then followed by a sequence of values for the identified optional attributes that are present. Thus, line 251 in FIG. 2B begins with a four-bit mask 253 having a value "1110" signifying that the Confidence, Reliability and Formation optional attributes are present while the Dimension optional attribute is absent. The values for Confidence 255, Reliability 257, and Formation 259 follow. Note that because the Formation optional attribute is specified by an enumeration of five values in the schema 200, at least three bits are necessary to encode its value, in this case "automatic."PThe encoding methodology now encodes the required elements 237 of the ProbabilityModelClass context node as shown in lines 261 and 271. Line 261 illustrates the encoding for the Label value "Nature Scenes." Because the required element 237 contains a choice of three elements within a unbounded sequence, a leading two-bit field 253 is used to specify which choice elements are present, and a trailing one-bit terminator field 267 containing a "0" is used to indicate the end of the sequence. In the present example, "00" in field 263 signifies that the value of the Label element follows in field 265. Because there is only one choice element in the exemplary instance document, the terminator field 267 immediately follows to terminate the sequence. Had additional choice elements been present, each would have been encoded as an identifier field 263, value field 265 pair until the sequence is terminated by a "0" in the terminator field 267.

Similarly, line 271 begins with a two-bit field 273 that specifies which of the optional elements within the required element are present. In the present example, "11" indicates that the DescriptiorName and ProbabilityModel elements are present. The value for the DescriptiorName element follows in field 275, while the values for the ProbabilityModel element is encoded as shown in lines 281 and 291.

As previously described with reference to line 251, line 281 begins with a mask 283 that specifies that the optional attributes Confidence and Dimensions for the ProbabilityModel element are present in the instance document. The mask 283 is followed by the Confidence value field 285 and the Dimensions value field 287.

The optional elements 249 are encoded next as shown in line 291. A mask 293 of "1100000" specifies that the optional elements Mean and Variance are present. Because the optional elements 249 can be repeated depending on their bounds, the encoding methodology uses a one-bit field 297 similar to the field 267 containing a "1" to indicate that more occurrences follow and a "0" to terminate the repetitions for this element. Thus, the two Mean values b 0.05 1 appear in fields 295 separated by a field 297 containing "1" and terminated by a field 297 containing a "0." The two Variance values 0.25 and 0.75 appear in fields 299 also separated by a field 297 containing "1" and terminated by a field 297 containing a "0."A "0" appearing in the trailing one-bit terminator field 277 indicates that no more DescriptiorName and ProbabilityModel elements are present.

Encoding the exemplary instance document according to the present invention reduces the amount of data transmitted from the generating system 101 to the presentation system 109 by approximately 85 percent. The original size of the instance document in uncompressed format is 398 bytes. Assuming the values of the instance document are codes as XML datatypes, the approximate size of the encoded instance document shown in FIG. 2B without additional compression is 63 bytes:

Line 251: 4 bits (mask 253) +8 bytes (field 255, 257) +3 bits (field 259)

Line 261: 2 bits (mask 263) +14 bytes (field 265) +1 bit (field 267)

Line 271: 2 bits (mask 273) +15 byes (field 275)

Line 281: 4 bits (mask 283) +5 bytes (fields 285, 287)

Line 291: 7 bits (mask 293) +16 bytes (fields 295, 299) +5 bits (fields 297, 277).

Thus, the first embodiment of the present invention saves the transmission of 335 bytes across the communication medium connecting the generation system 101 and the presentation 109 and thereby reduces the amount of time necessary to transmit the instance document to the presentation system 109.

In the second embodiment, the schema order of the optional attributes and elements is not guaranteed to be preserved when the instance document is binarized. Therefore, an extra one-bit "order" field is prefixed to the sections of the encoded instance document that contain the values for the optional attributes/elements. In this embodiment, a "1" indicates that the schema order is preserved and a "0" indicates that the following list of values is unordered. If the order is preserved, the remainder of the optional attribute/element section is encoded as in the first embodiment.

If the list is unordered, a "number" field follows the order field to specify the number of optional attributes/element that occur in the instance document. The order and number field combination ("header") is used in place of the masks 253, 283, 293 shown in FIG. 2B. For example, a context node that has three optional attributes and five optional elements requires a two bit number field for the attributes and a three bit number field for the elements. Thus, the headers for the optional attributes and optional elements would be three and four bits long, respectively. Each optional attribute and element is further assigned a unique fixed-length identifier that associates it with its definition in the schema. Each optional attribute/element present is encoded as an identifier, value pair following the header. Repeating elements are suffixed with a one-bit field as described above in conjunction with FIG. 2B.

In the third embodiment, each optional attribute/element is encoded as an identifier, value pair without regard to whether the schema order is preserved. Optionally, each required attribute/element can also be so encoded to conform with generally accepted rules for well-formed data and enable easier verification of the validity of the data. Repeating elements are encoded with the one-bit field as in the first and second embodiments but the masks and headers of the first and second embodiments are not used.

Next, the particular methods of the invention are described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (the processor of the computer executing the instructions from computer-readable media) acting as the generation system 101 to create the encoded instance document 107 and as the presentation system 109 in de-coding the encoded instance document 107. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

Figures 3A, 4A:
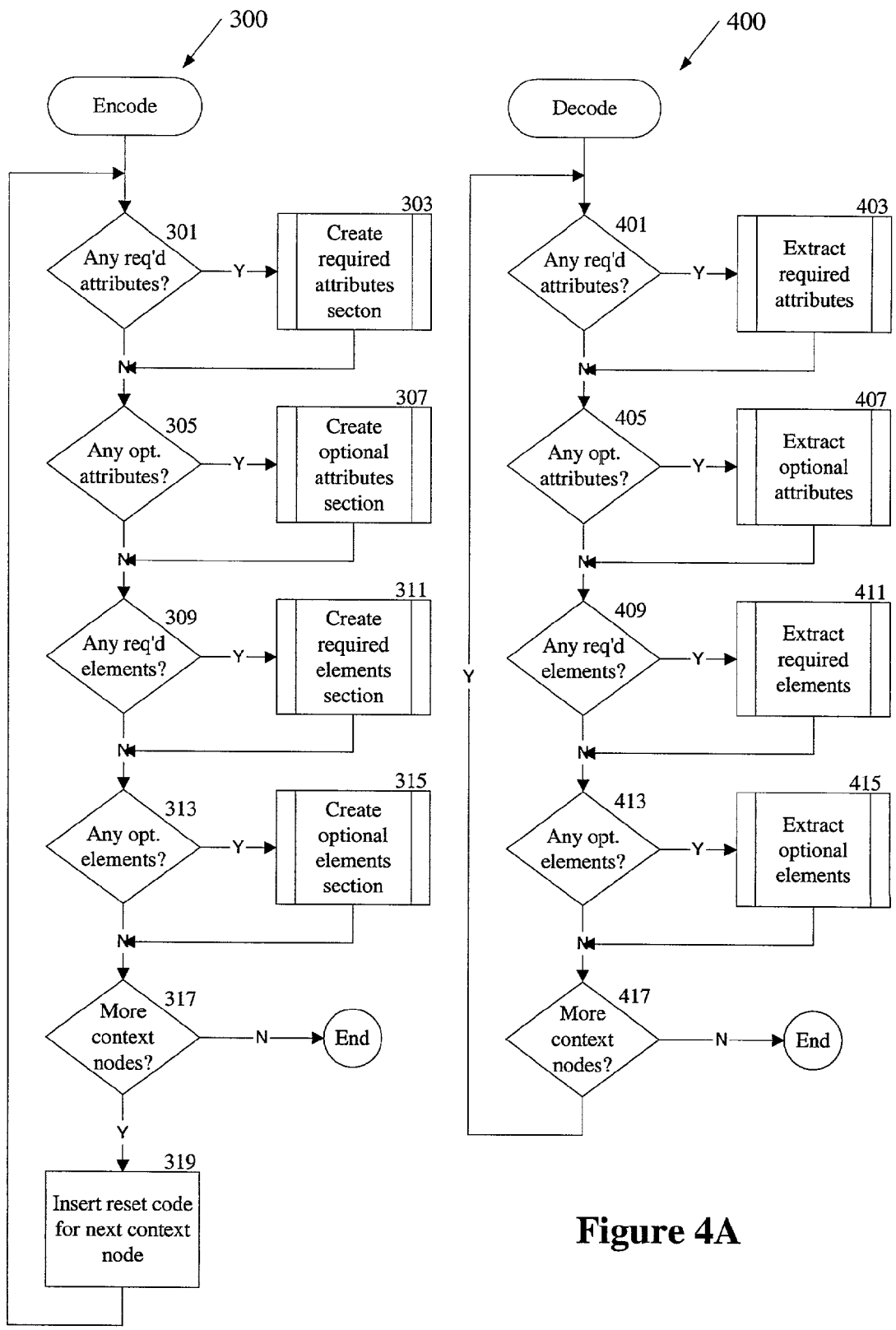
FIGS. 3A-E are flowcharts of an encoding method to be performed by a computer according to an embodiment of the invention.
FIGS. 4A-E are flowcharts of a decoding method to be performed by a computer in conjunction with the method of FIGS. 3A-E.

FIG. 3A illustrates an encode method 300 for encoding an instance document and FIG. 4A illustrates a decode method 400 for decoding the encoded instance document produced by the method 400. FIGS. 3B-E illustrate supporting methods for FIG. 3A that encode an instance document according to the first and second embodiments of the present intention. FIGS. 4B-E represent supporting methods for FIG. 4A that decode the encoded instance document produced by the methods of FIGS. 3B-E. FIGS. 3F and 4F illustrate supporting encoding and decoding methods for the third alternate embodiment of the invention. The methods are described in conjunction with encoding formats shown in FIGS. 5A-5E Turning now to FIG. 3A, the acts to be performed by a computer acting as the generation system 101 are described. The method 300 produces an encoded instance document 500 with a format shown in FIG. 5A. Each context node in the encoded instance document 500 is specified in a required attributes section 501, an optional attributes section 503, a required elements section 505 and an optional elements section 507. One or more of these section may be absent depending on the structure of the content. Furthermore, if more than one context node is present, a context-node reset code 509 contains an address for the next context node in the content. The details of the sections 501, 503, 505 and 507 are described with reference to FIGS. 5B-E, respectively below.

The encode method 300 evaluates each context node in the content description at blocks 301, 305, 309 and 313 with respect to the context node schema, and creates the necessary corresponding sections in the encoded instance document at blocks 303, 307, 311 and 315. The processing represented by blocks 303, 307, 311 and 315 are described in further detail below in conjunction with FIGS. 3B-E, respectively, and FIG. 3F collectively. For each context node except the last (block 317), the method 300 inserts the reset code 509 that specifies the address for the next context node into the encoded instance document (block 319). When all context nodes in the content have been encoded, the method 300 terminates.

A decode method 400 shown in FIG. 4A execution on a computer acting as the presentation system 109 operates in reverse of the encode method 300. The decode method 400 evaluates the encoded context node with reference to the context node schema at block 401, 405, 409 and 413, and extracts the attributes and elements for the content accordingly at blocks 403, 407, 411 and 415. The processing represented by blocks 403, 407, 411 and 415 are described in further detail below in conjunction with FIGS. 4B-E, respectively, and FIG. 4F collectively. If the decode method 400 encounters a reset code (block 417), it begins decoding the context node specified by the address. When the last context node in the encoded instance document has been decoded, the decode method 400 terminates.

Figure 3B:
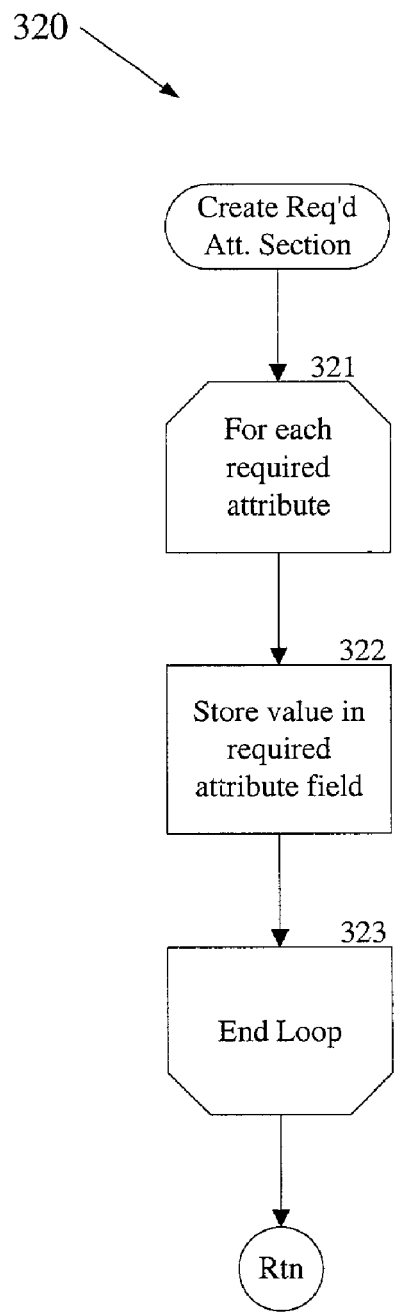
Figure 5A:
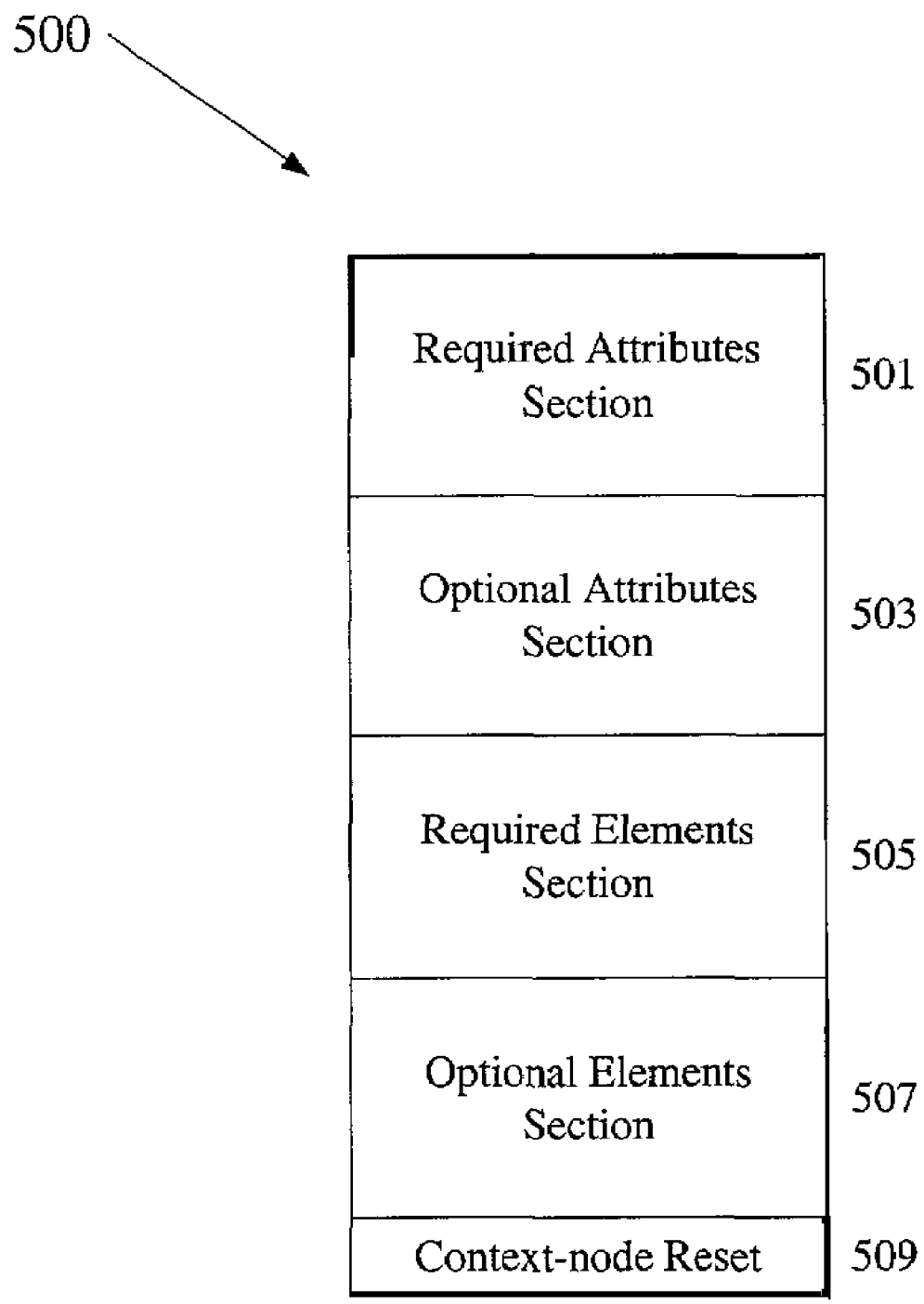
FIGS. 5A-E are diagrams of encoded data structures created by the methods of FIGS. 3A-F.
Figure 5B:
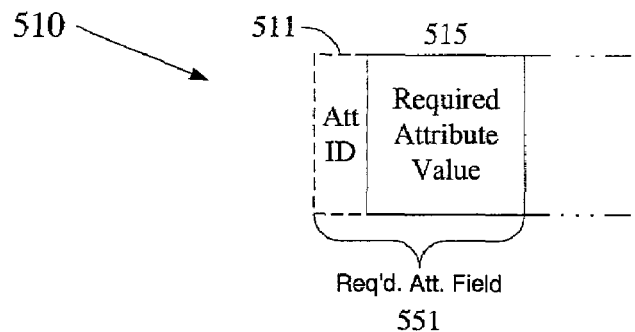

For the first and second embodiments, the method 300 in FIG. 3A invokes a supporting method 320 as shown in FIG. 3B to create the required attributes section 501. As illustrated in FIG. 5B, the required attributes section 501 for the first and second embodiments contains a required attributes field 511 for each required attribute, which contains the value 515 of the required attribute (format 510). For each attribute (block 321), the method 320 stores the value 515 in the required attributes field 551 (block 322). Once all the required attributes have been encoded, the method 320 returns to the encode method 300.

Figure 4B:
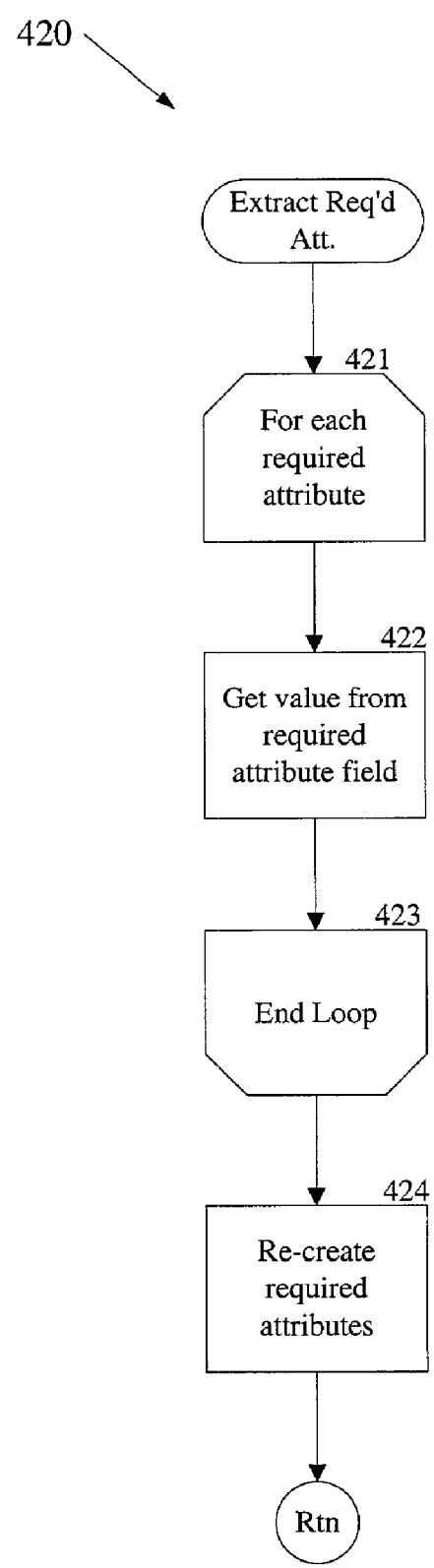

The method 400 of FIG. 4B invokes a supporting method 420 as shown in FIG. 4B to extract the values of the required attributes from the section 501. For each required attribute (block 421), the method 420 gets the value 515 from the field 511 as defined by the context node schema (block 422). Once all of the required attribute values have been extracted (block 423), the values are used to re-create that portion of the content description and the method 420 returns to the decode method 400.

Figure 3C:
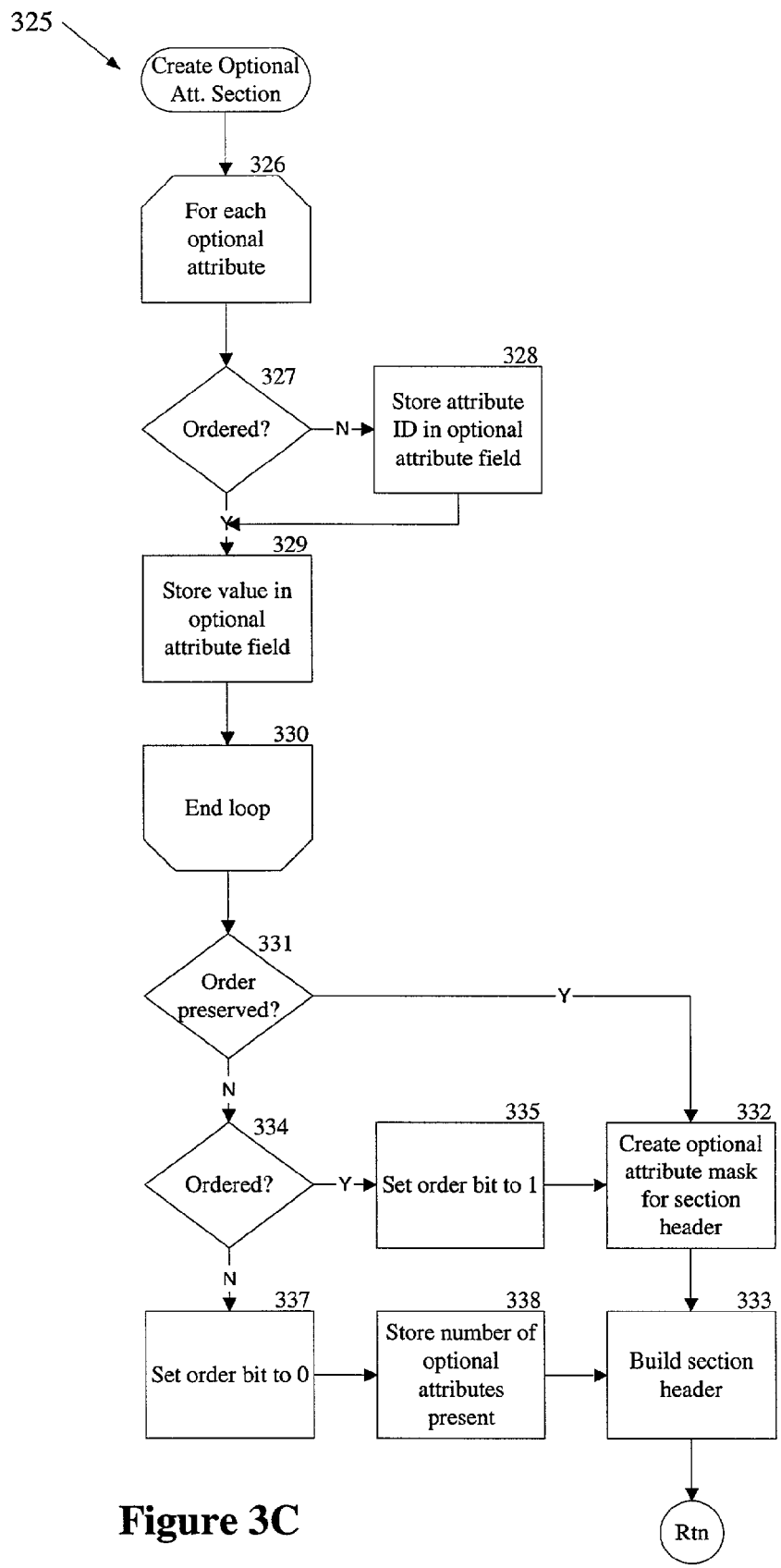

The method 300 invokes a supporting method 325 shown in FIG. 3C to create the optional attributes section 503. When the schema order is preserved or when the optional attributes are in schema order, the section 503 is created according to format 520. When the optional attributes are unordered, format 530 is created. In either case, the section 503 consists of a header section 521, 531 and an optional attributes field 523, 533 for each optional attribute present in the context node. The section header 521 contains only the optional attributes mask 527 when the schema order is preserved. An order bit 525 of value "1" is added when the schema order may be preserved to indicate that the following attributes are ordered. When the attributes are unordered, the section header 531 contains a "0" in the order bit 525 and a number field 535 that defines the number of optional attributes present. Each optional attribute is represented by an identifier 537, value 529 pair in the corresponding optional attributes field 533.

For each optional attribute (block 326), the method 325 determines if the attributes are in schema order (block 327). If the attributes are unordered, the attribute identifier 527 is stored in the optional attributes field 523 (block 328 ). The value 539 is stored in the optional attribute field 523, 533 at block 329. Once all the optional attributes have been encoded in the optional attributes field 523, 533 (block 330), the method 325 determines if the schema order is preserved (block 331). If it is, the method 325 creates the optional attribute mask 521 (block 332) and builds the section header 521 (block 333).

On the other hand, if the schema order may not be preserved, the method 325 determines if the optional attributes are unordered (block 334). If the attributes are ordered, the order bit 525 is set to "1" at block 335, the optional attribute mask 527 is created at block 332, and the section header 521 is built at block 333. If optional attributes are unordered, the order bit 525 set to 0 (block 337). The number of optional attributes present is stored in the number field 535 at block 338 and the section header 531 is built at block 333.

Figure 4C:
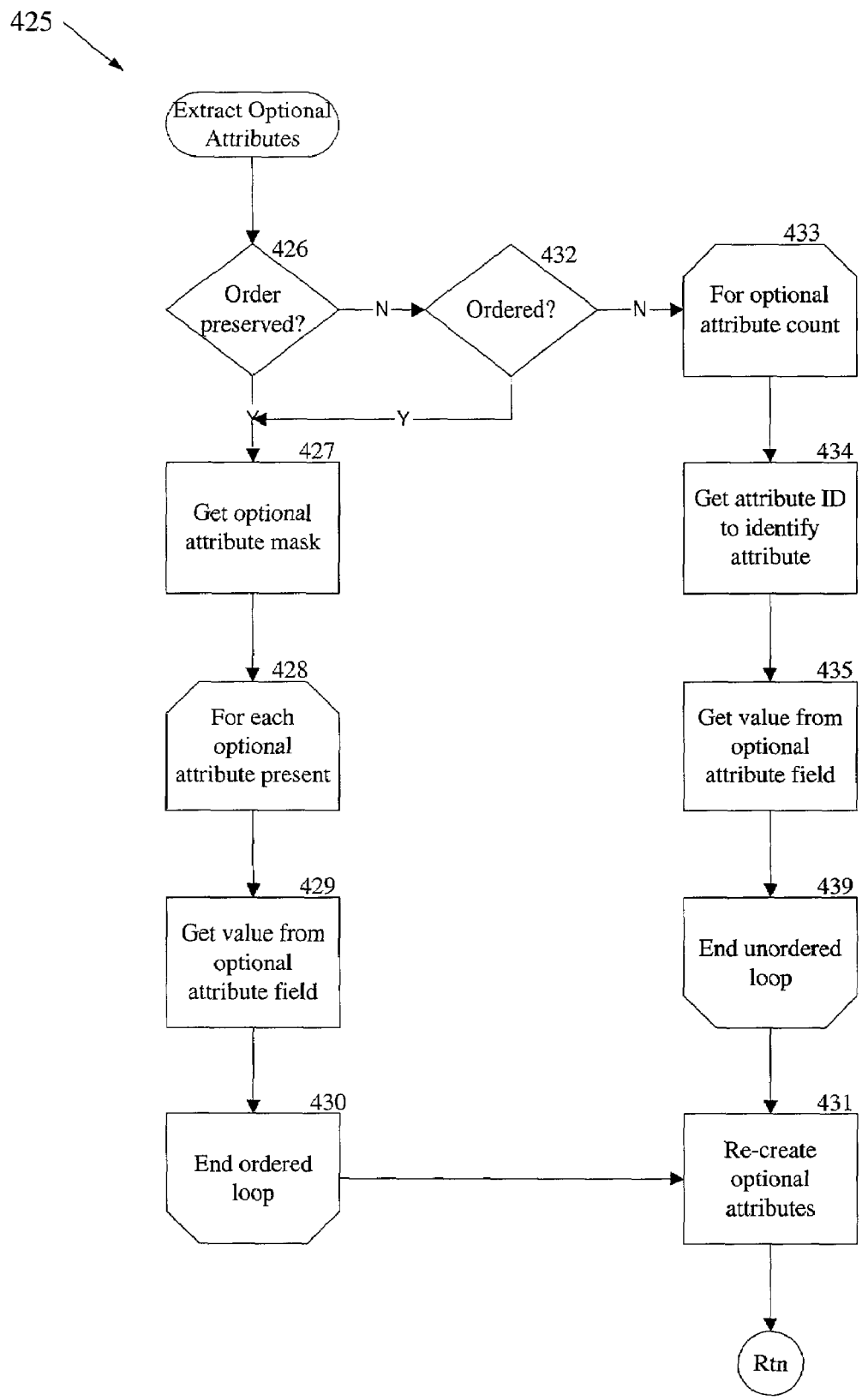

The decode method 400 invokes a supporting method 425 shown in FIG. 4C to extract the optional attributes from the encoded instance document. The method 425 refers to the context node schema to determine if the schema order is preserved (block 426). If it is, the method 425 decodes the optional attributes section according to format 520 by getting the optional attributes mask 527 from the section header 521. For each optional attribute specified as present by the mask 527 (block 428), the method 425 gets the corresponding value 529 from the optional attributes field 523 (block 429). Once all the optional attribute values have been extracted (block 430), they are used to re-create the optional attributes for the context node in the content description (block 431) and the method 425 returns to the decode method 400.

If the method 425 determines if the schema order may not be preserved at block 426, it reads the order field 525 to determine if the attributes are ordered (block 432). If they are, the method 425 proceeds as if the schema order was preserved (looping through blocks 427 through 430). Otherwise, the number of optional attribute elements is obtained from number field 535 in the section header 531 to serve as a ioop counter at block 433. The method 425 extracts the attribute identifier 537 from the each optional attributes field 533 at block 434. It uses the identifier to determine the characteristics of the optional attribute from the schema and extracts the corresponding value 529 from the field 533 at block 435. Once all the values for the optional attributes have been extracted, the method recreates the optional attributes for the context node at block 431 and returns to the decode method 400.

Figure 3D:
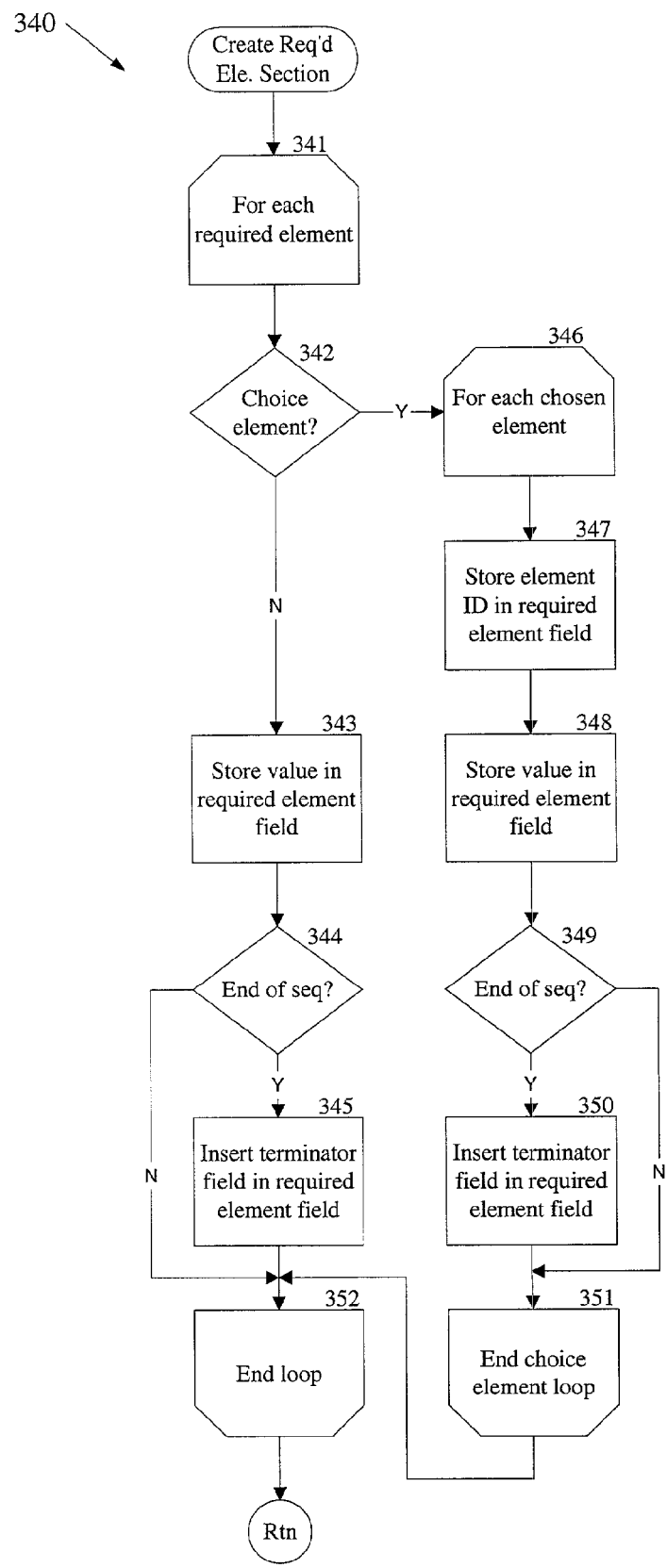
Figure 5C:
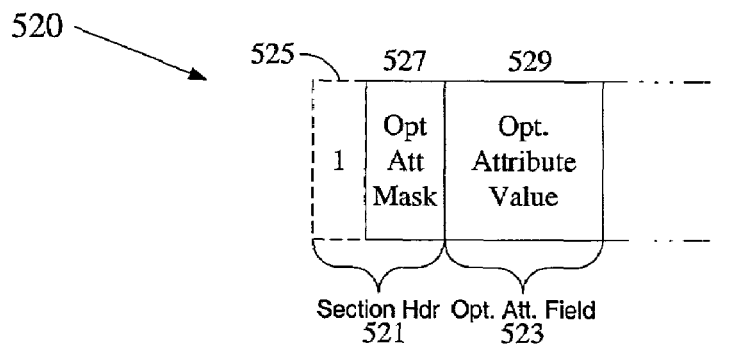
Figure 5C:
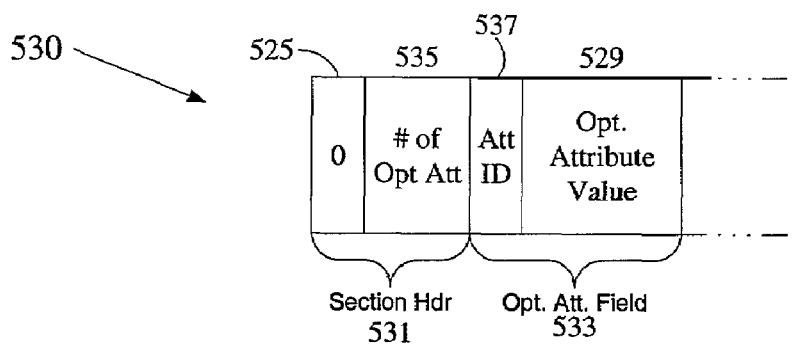
Figure 5C:
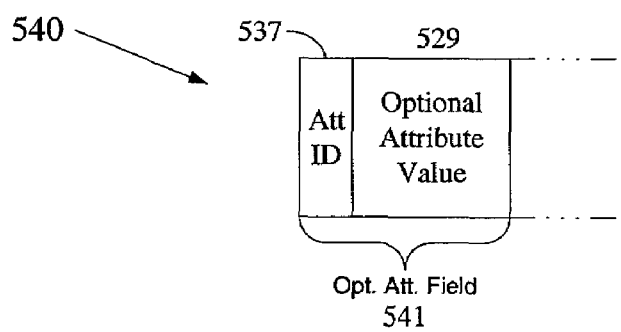
Figure 5D:
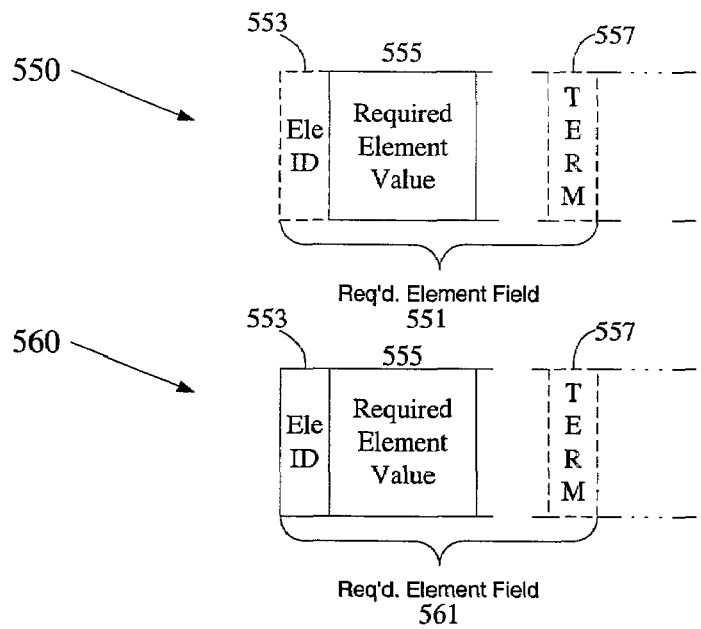
Figure 5E:
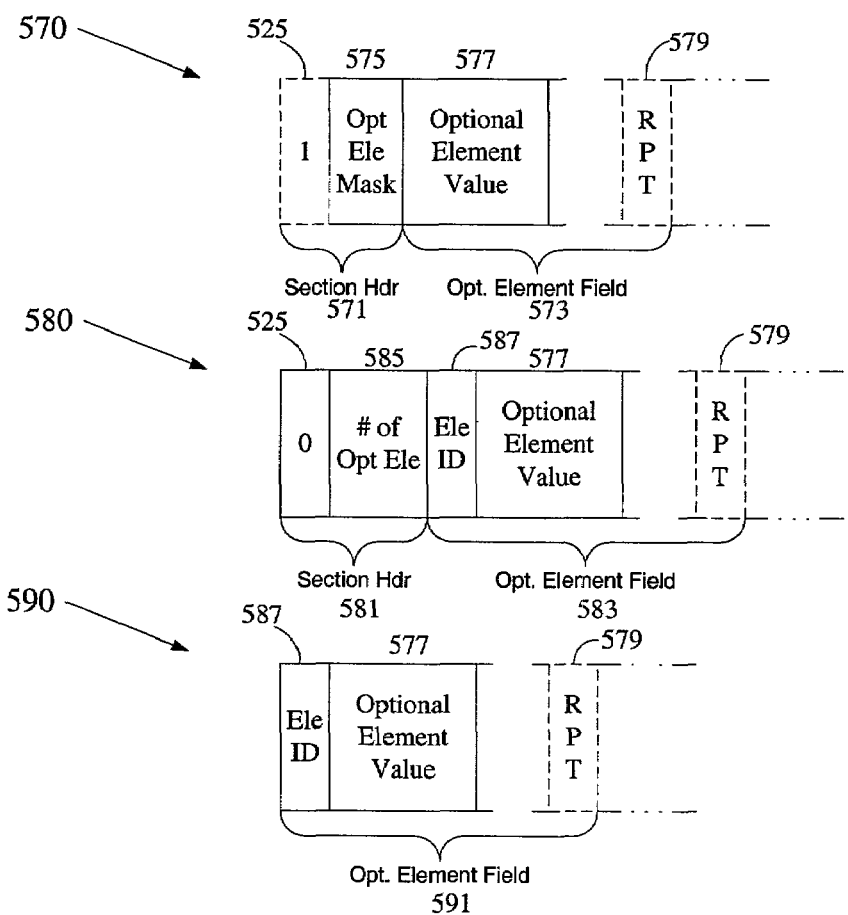

The encode method invokes a supporting method 340 shown in FIG. 3D to create the required elements section 505 according to formats 550, 560 shown in FIG. 5D. Each format 550, 560 defines a required element field 551, 561. For a singular required element, the element field 551 contains the corresponding element value 555. If a required element is a choice element, the required element field 561 contains an identifier 553, value 555 pair for each required element. Furthermore, if the required element is an unbounded sequence, the required element field 551, 561 ends with a terminator field 557 (set to "0") to terminate the sequence.

For each required element (block 341), the method 340 determines if the element is a choice element (block 342). If not, it stores the value 555 of the required element in the required elements field 551 (block 343). If the element is defined as an unbounded sequence and the value 555 is the last in the sequence (block 344), the terminator field 557 is inserted after the last value 555 in the required element field 551 (block 345).

If, however, the required element is determined to be a choice element at block 342, for each chosen element (block 346), the method 340 stores an element identifier 553 (block 347) and the corresponding value 555 (block 348) in the required element field 561. If the required choice element is defined as an unbounded sequence and the value 555 is the last in the sequence (block 349), the terminator field 557 is inserted in the required element field 561 (block 350). Once all of the choice elements have been encoded (block 351), the method 340 loops back to block 341 to process the next required element. When all the required elements have been processed (block 352), the method 340 returns to the encode method 300.

Figure 4D:
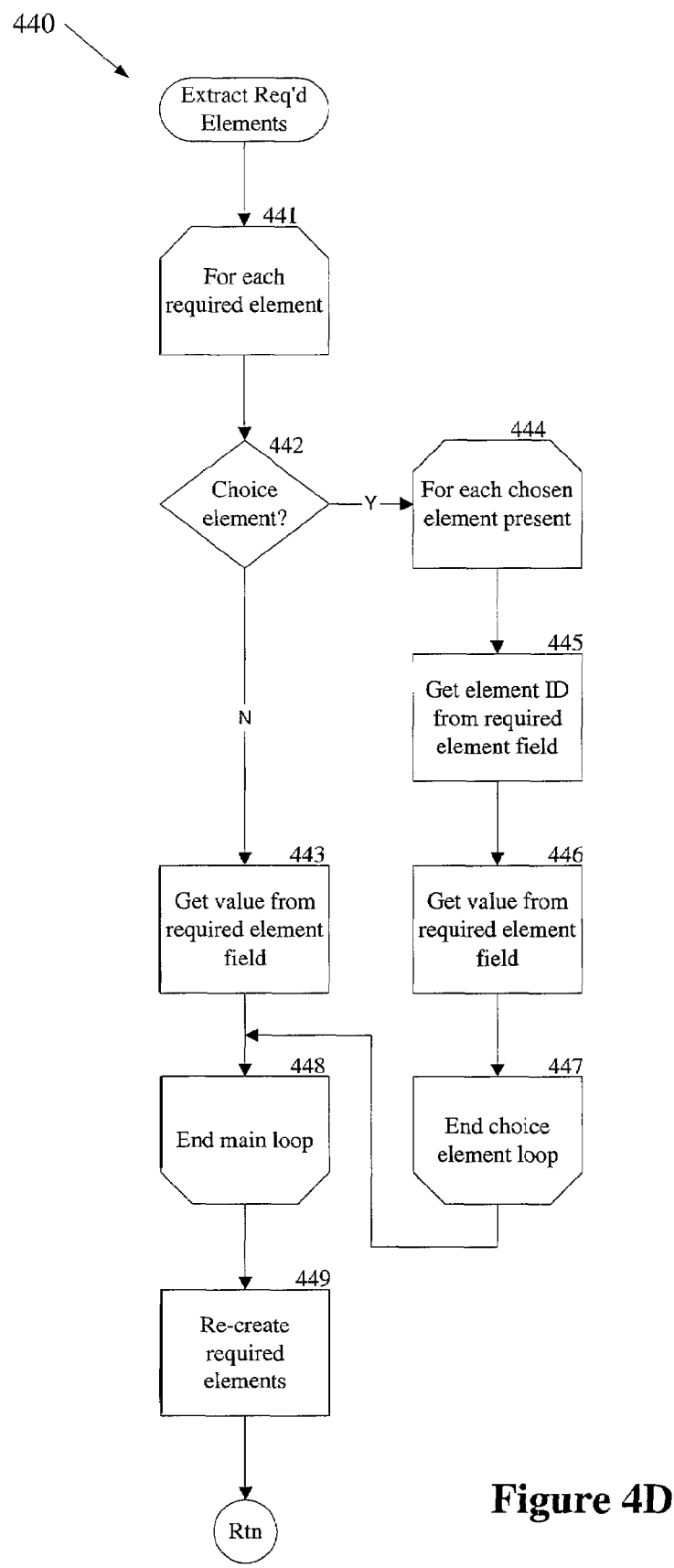

The decode method 400 invokes a supporting method 440 shown in FIG. 4D to extract the required elements for a context node from the encoded instance document. For each required element (block 441), the method 440 determines if the element is a choice element based on the context node schema (block 442). If it is not, the value has been encoded according to format 550. Therefore the method 440 gets the required element value 555 from the required elements field 551 at block 443. If the element is defined as an unbounded sequence, the terminator field 557 is used to determine when the sequence ends and the next required element begins. If the element is a choice element, the value has been encoded according to format 555. If the choice element is unbounded, the method 440 relies on the terminator field 557 to determine the end of the sequence of choices; otherwise, the number of choices present is defined in the schema. For each choice element present (block 444), the method 440 gets the element identifier 553 from the required element field 561 at block 445 and uses the element identifier to determine the characteristics of the choice. The required element value 555 is obtained from the required element field 561 in accordance with the schema (block 446). After all chosen values have been extracted (block 447), method for 440 proceeds to block 441 to process the next required element. If there are no more elements (block 448), the values are used to re-create the required elements for context node in the content at block 449 and the method 440 returns to the decode method 400.

Figure 3E:
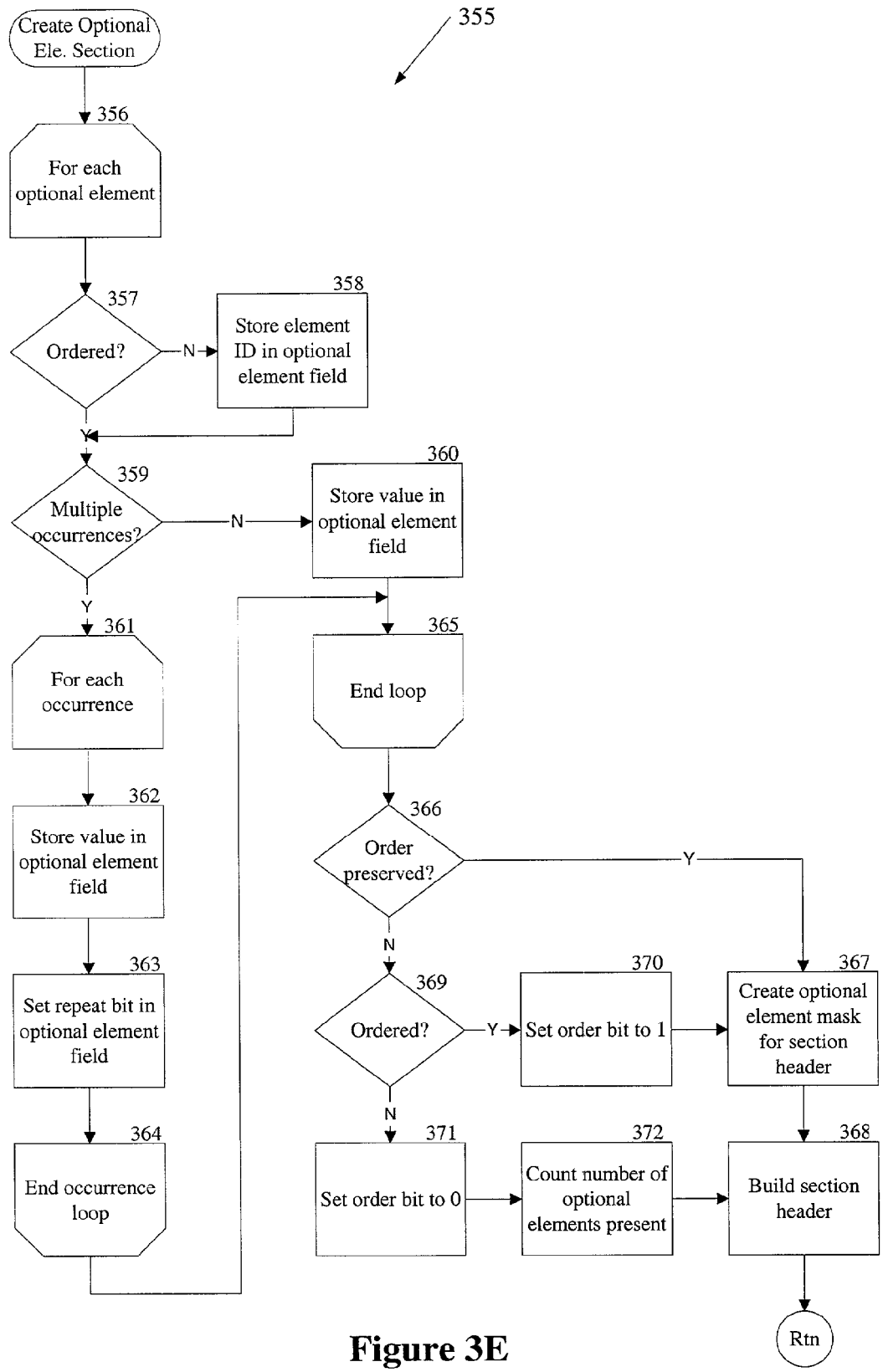
Figures 3F, 4F:
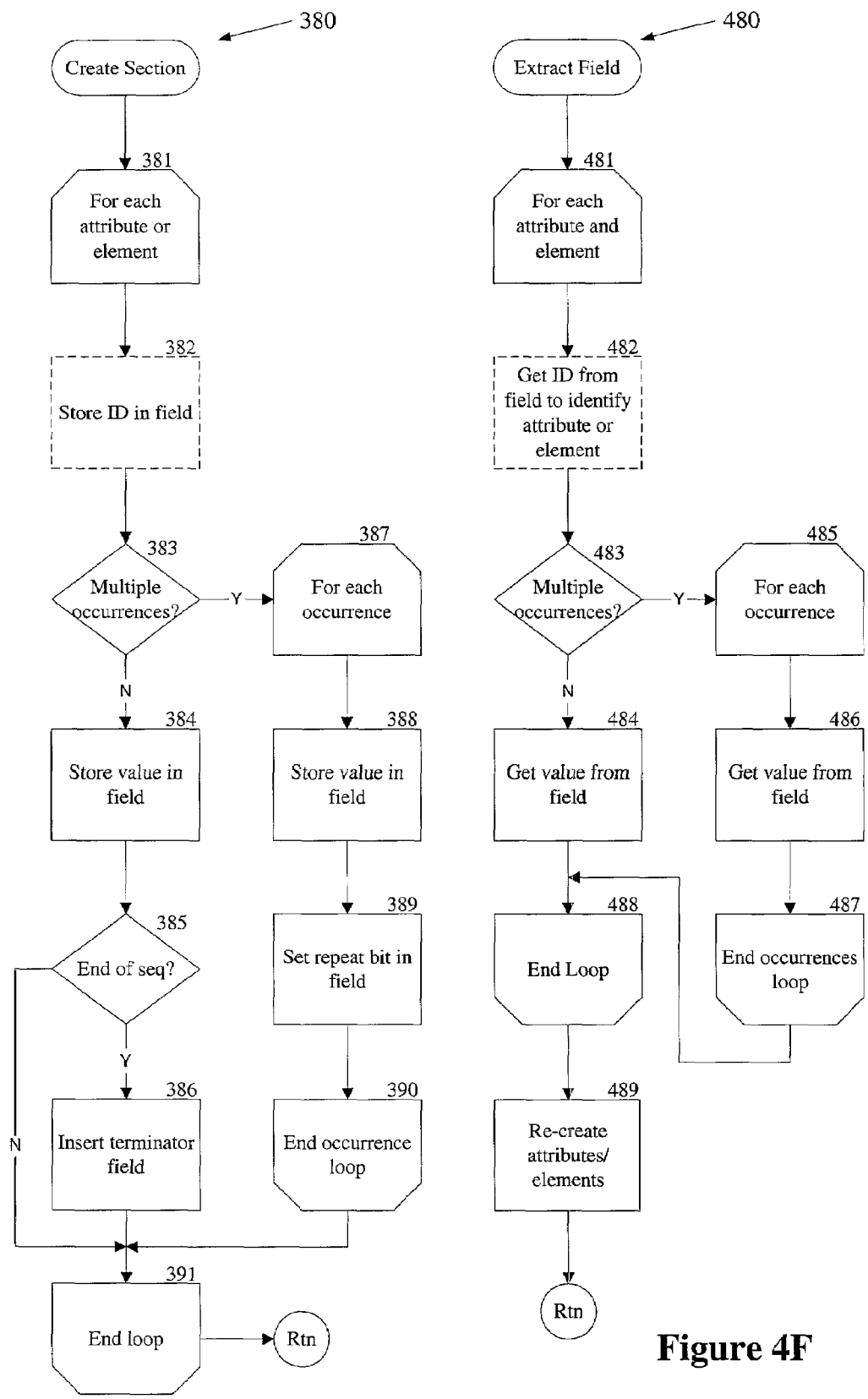
FIG. 3F is a flowchart of an encoding method to be performed by a computer according to an alternate embodiment of the invention.
FIG. 4F is flowchart of an decoding method to be performed by a computer in conjunction with the method of FIG. 3F.

The encode method 300 invokes a supporting method 355 as shown in FIG. 3E to create the optional elements section 507. When the schema order is preserved or when the optional elements are in schema order, the section 507 is created according to format 570. When the optional elements are unordered, format 580 is created. In either case, the section 507 consists of a header section 571, 581 and an optional element field 573, 583 for each optional element present in the context node. The section header 571 contains only the optional elements mask 575 when the schema order is preserved. An order bit 525 of value "1" is added when the schema order may not be preserved to indicate that the following elements are ordered. When the elements are unordered, the section header 581 contains a "0" in the order bit 525 and a number field 585 that defines the number of optional elements present.

The optional element field 573 contains the value 577 for an optional element and a repeat bit 579 if the element may occur multiple times. The repeat bit 579 is set to "1" if another occurrence follows or to "0" if the preceding value is the last. If the optional elements are unordered, each element is identified by an identifier field 587. For a non-repeating element, a single value 577 follows the identifier field 587. For an element that may have multiple occurrences, each value 577 is followed by the appropriate the repeat bit 579 in the optional element field 583.

For each optional element (block 356), the method 355 determines if the elements are in schema order (block 357). If the elements are unordered, the method 355 stores the element identifier 358 in the optional element field 383 (block 358). If the element is a non-repeating element (block 359), the optional element value 577 is stored in the optional element field 573, 583 (block 360). If there may be multiple occurrences for the element, for each occurrence (block 361), the method 355 stores the value 577 (block 362) in the optional element field 537, 583, at block 362 and sets the appropriate repeat bit 579 at block 363. Once each occurrence has been encoded (block 364), the method 355 loops to block 356 to process more optional elements. If all optional elements have been encoded (block 365), the method 355 determines whether the schema order is preserved (block 366). If so, the method 355 creates the optional element mask 575 (block 367) and builds the section header 571 (block 368). Otherwise, if the schema order may not be preserved, the method 355 determines whether the elements are ordered (block 369). If so, the order bit 525 is set to "1" at block 370, the optional element mask 575 is created at block 367, and the section header 571 is built at block 368. If however the elements are unordered (block 369), order bit 525 is set to "0" at block 371, the number of optional elements present is counted to create the number field 585 at block 372, and the section header 581 is built at block 372. Once the optional elements section is completely encoded, the method 355 returns to the encode method 300.

Figure 4E:
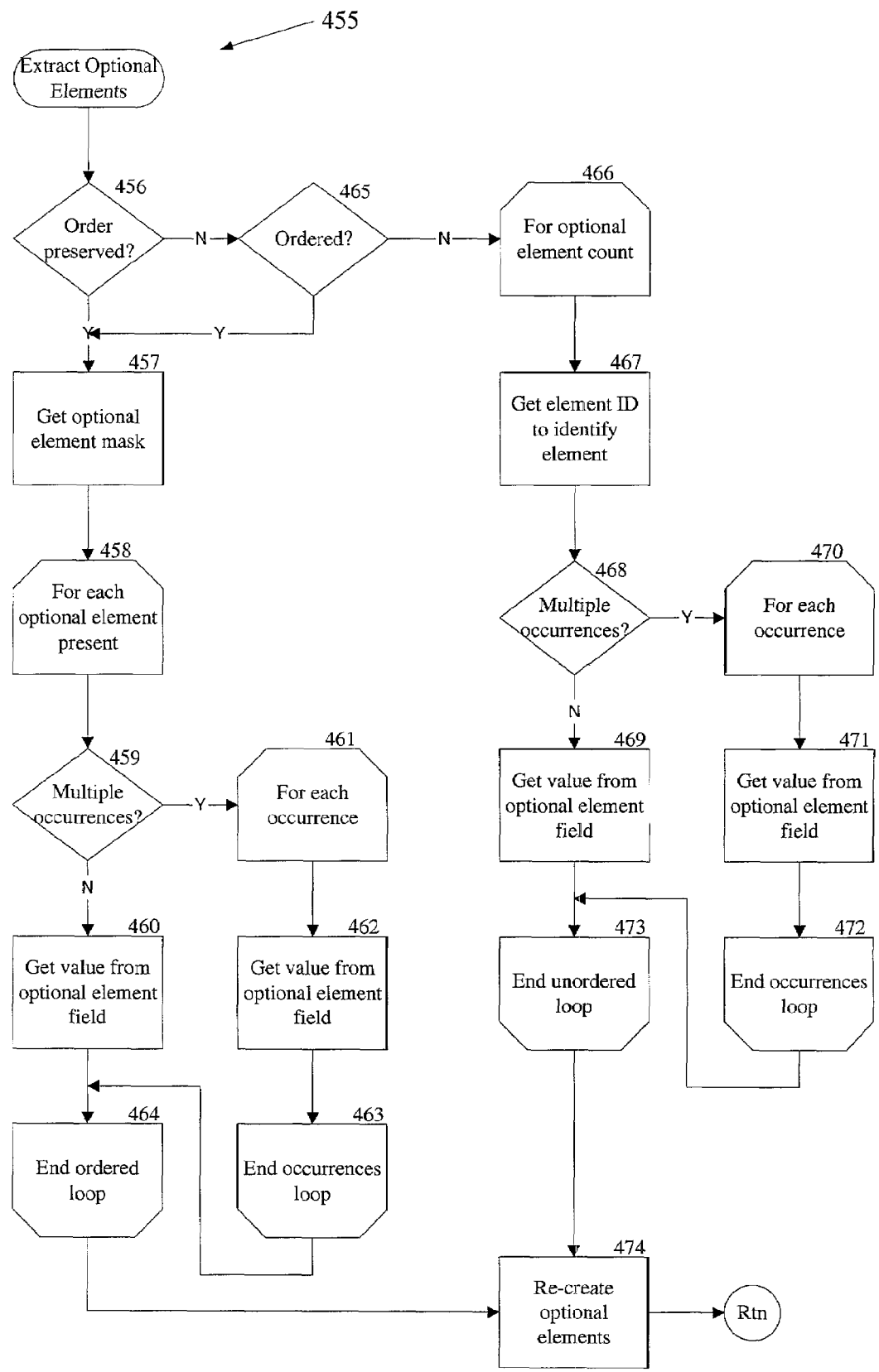

The decode method 400 invokes a supporting method 455 shown in FIG. 4E to extract the optional elements from the encoded instance document. The method 455 determines whether schema order is preserved (block 456). If it is, the optional elements section is encoded using format 570 and the method 455 gets the optional element mask 575 from the section header 571 at block 457. For each optional element specified as present by the mask 575 (block 458), the method 455 uses the schema to determine if the element may have multiple occurrences (block 459). If the element is non-repeating, the value 577 is extracted from the optional element field 573 at block 460. Multiple occurrences are handled by evaluating each occurrence (block 461) and extracting the value 577 from the optional elements field 573 (block 462). When the repeat field 579 is "0," the method 455 loops to block 458 to process more optional elements.

Returning now to block 456, if the schema order may not be preserved, the method 455 determines whether or not the elements are in order using the order field 525 (block 465). If they are in order, the section is encoded using format 570 and the method 455 proceeds as if schema order was preserved by obtaining the mask 575 at block 457 and looping through blocks 458 through 464. If the elements are not ordered, the section is encoded according to format 580 and the value in the number field 585 is used as a counter for the loop starting at block 466 and ending at block 472. For each optional element, the identifier 587 is obtained from the optional elements field 583 (block 467) and used to determine the characteristics of the element in the schema. If the element cannot repeat (block 468), the method 455 gets the value 577 from the optional element field 583 at block 469. If there may be multiple occurrences of the element, for each occurrence (block 470) the value 577 is extracted from the optional elements field 583 at block 471. Once all occurrences for this particular element have been extracted, (i.e., the repeat field 579 is "0". (block 473), the method 455 returns to block 467 to process the next element.

Once the values for all the optional elements have been extracted, the method 455 re-creates the optional elements for the context node (block 474) and returns to the decode method 400.

Turning now to the third embodiment of the invention, a supporting method 380 shown in FIG. 3F is invoked by the encode method 300 to create each section of the encoded instance document and a supporting method 480 shown in FIG. 4F is invoked by the decode method 400 to extract the attribute/element values from each sections of the encoded instance document. Format 510 shown in FIG. 5B is used to format the required attributes section. The attribute identifier 513 may be used to achieve a well formed and more easily validated instance document. The optional attributes section is encoded according to format 540 with an optional attributes field 541 and no section header as shown in FIG. 5C. Format 550 shown in FIG. 5D is used to format the required elements section, with the element identifier 553 as an option. The optional element section is encoded according to format 590 shown in FIG. 5E.

For each attribute or element to be encoded (block 381) the method 380 stores an identifier in each field if necessary (block 382). Attributes and required elements proceed to block 384, where the attribute/element value is stored in the appropriate field. If a required element is an unbounded sequence and the value being encoded is the last in the sequence (block 385), the terminator field 557 is inserted (block 386). For an optional element, the method 380 determines if the element may have multiple occurrences (block 383). If not, the method 380 continues onto block 384. If there may be multiple occurrences, for each actual occurrence (block 387), the method 380 stores the element value (block 388) and the appropriate repeat field 570 in the optional element field 591 (block 389). Once all occurrences have been encoded (block 390), the method 380 returns to block 381 to process the next optional element. When all values for the section have been encoded (block 391), the method 380 returns to the encode method 400.

To extract each encoded value for a section (block 481), the supporting method 480 obtains the identifier, if present, (block 482) to determine the characteristics of the corresponding attribute/element in the schema. For attributes and required elements, the method 480 proceeds to block 484 where the value is obtained from the appropriate field. If a required element is an unbounded sequence, the required element field 561 is terminated by a terminator field 557 and the processing represent by block 484 parses the field 561 for values until the terminator field 557 is encountered. If an optional element has multiple occurrences (block 483), for each occurrence indicated by the repeat bit 579 (block 485), the method 480 obtains the value 577 from the optional elements field 591 (block 486). Once all occurrences have been obtained (block 487), the method 480 loops to block 482 to process the next optional element. Once values for all the attributes/elements in the section have been extracted from the encoded instance document (block 488), the section for the context node is re-created at block 489 and the method 480 returns to the decode method 400.

The particular methods performed by a computer operating as a generation system and a computer operating as a presentation system according of three embodiments of the invention have been described. The methods performed by the generation system have been shown by reference to flowcharts in FIGS. 3A-F including all the acts from 301 until 319, from 321 until 323, from 326 until 338, from 341 until 352, from 356 until 372, and from 381 until 391, respectively. The methods performed by the presentation system have been shown by reference to flowcharts in FIGS. 4A-F including all the acts from 401 until 417, from 421 until 424, from 426 until 439, from 441 until 449, from 456 until 474, and from 481 until 489, respectively. It will be appreciated that more or fewer processes may be incorporated into the methods illustrated in figures without departing from the scope of the invention and that no particular order is implied by the arrangement of blocks shown and described herein. For example, the supporting decode methods have been described as re-creating the section when all the corresponding values have been extracted from the encoded instance document, but one of skill in the art will readily understand that the section can be re-created piecemeal as each value is extracted. Furthermore, one of skill in the art will readily understand that the re-creation of each section can be delayed until the values for all sections have been extracted.

Figure 6:
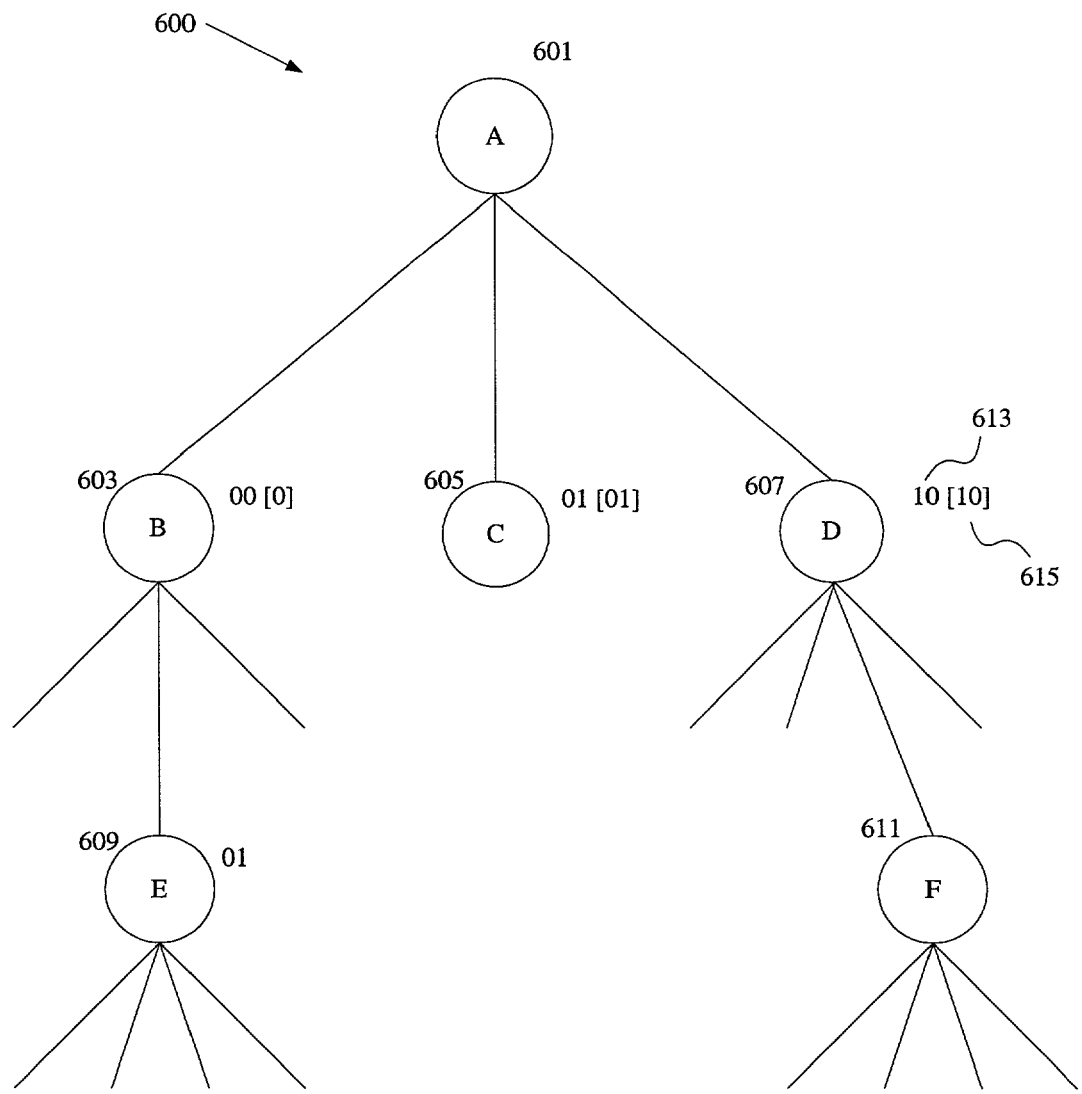
FIG. 6 is a diagram of an abstract structure for a piece of content.

The identifiers for attributes and elements, and the addresses for context nodes can be assigned in various ways. In one embodiment, the identifiers and addresses are based on the relationships 600 between the elements within the content as illustrated in FIG. 6. Context node A 601 has three optional attributes/elements represented as node B 603, node C 605, and node D 607. Each of the optional attributes/elements can be uniquely identified within its context node by a two-bit code word 613, i.e., 00, 01, and 10. In an alternate embodiment also shown in FIG. 6, the frequency 615 with which a particular optional attribute/element appears in the context is used as the identifier. The frequency 615 can be determined through Huffman or arithmetic coding techniques that employ static/dynamic frequency tables.

A second context node E 609 is addressed by the identifiers for the nodes on its path from the top node in the content, in this case node A 601. Thus, the address for the context node E 609 is 0001, where 00 is the identifier 613 for node A 603 and 01 is the identifier for the context node E 609. Therefore, to indicate a change from context node A 601 to context node E 609 in an encoded instance document, the reset field would contain 0001. A third context node F 611 is also illustrated in FIG. 6.

Figure 7A:
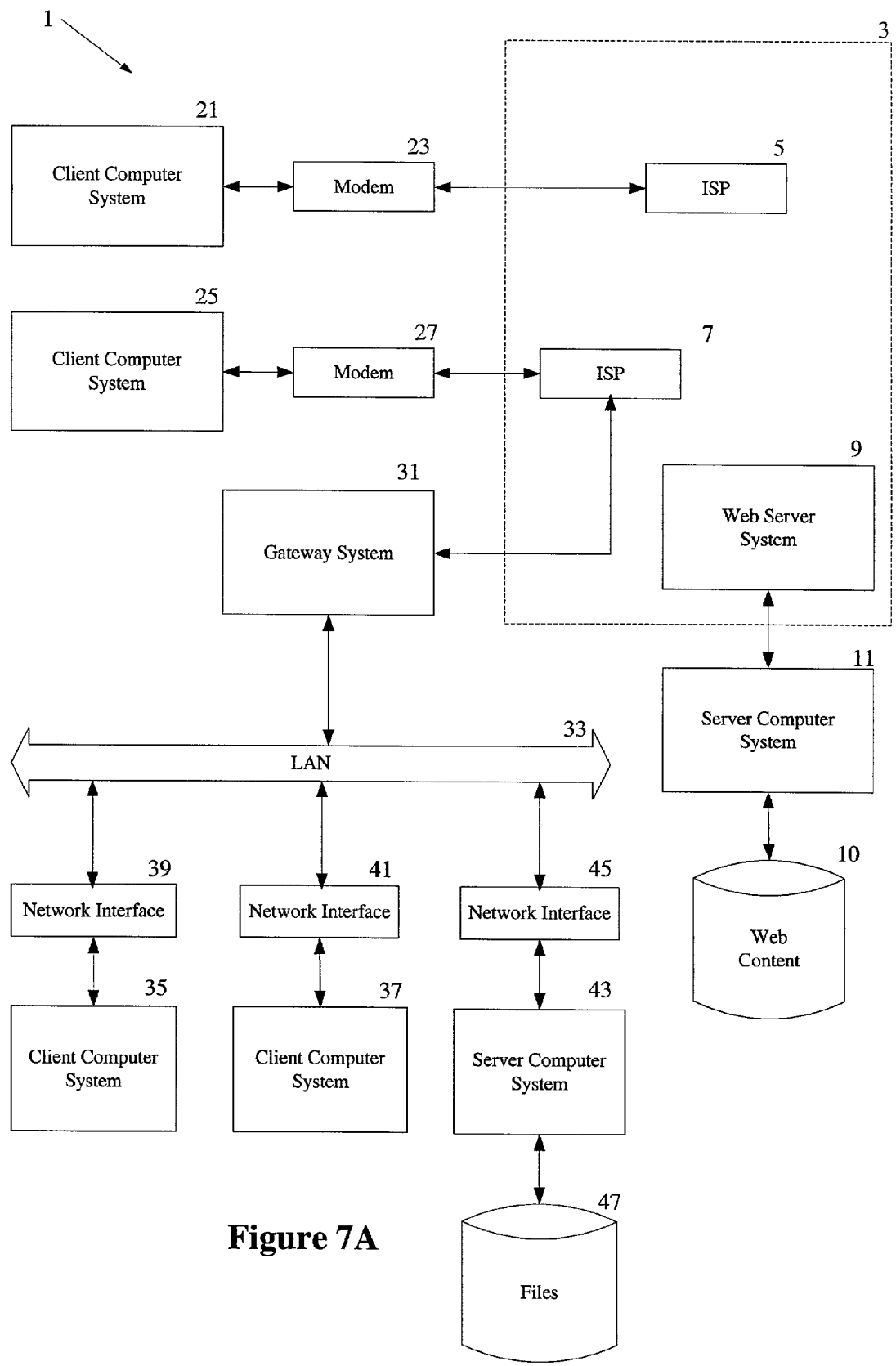
FIG. 7A is a diagram of one embodiment of an operating environment suitable for practicing the present invention.
Figure 7B:
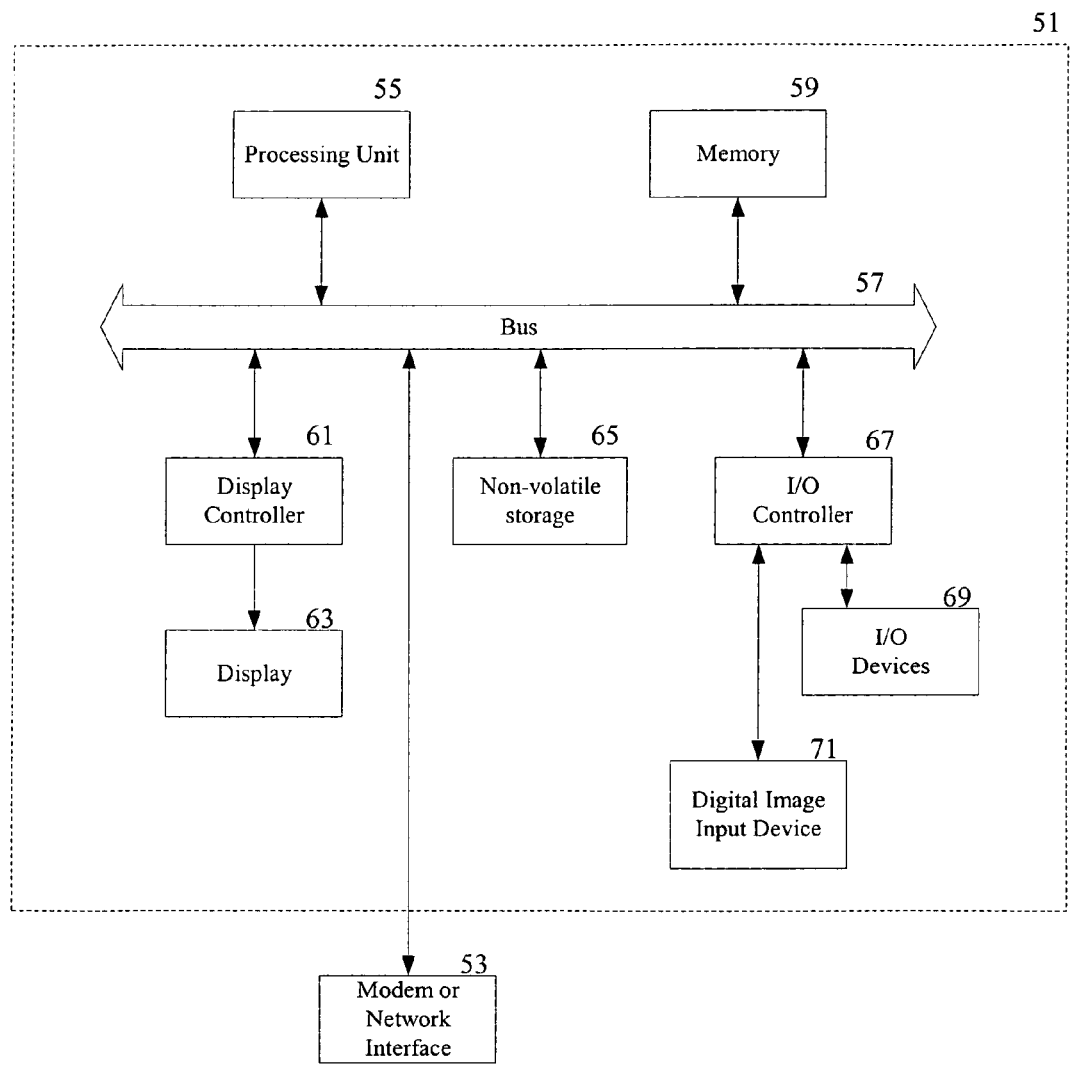
FIG. 7B is a diagram of one embodiment of a computer system suitable for use in the operating environment of FIG. 7A.

The following description of FIGS. 7A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, mini-computers, mainframe computers, and the like. The invention can also be practiced in distributed computing environments where tasks are performed by remote processing devices that are linked through a communications network.

FIG. 7A shows an operating environment 1 in which several computer systems are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 7A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 7A, the connections are not the same for these three computer systems. Client computer system 25 is coupled through a modem interface 27 while client computer systems 35 and 37 are part of a LAN. While FIG. 7A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other iternet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 7B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (IO) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 7B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

An encoding methodology for instance document of a description associated with multimedia content has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the invention is not limited to practice with multimedia content complying with the MPEG-7 standard. Furthermore, those of ordinary skill within the art will appreciate the schema that describes the multimedia content descriptions may be written in a data definition language that does not define the content as XML datatypes.

The terminology used in this application with respect to encoding multimedia content description is meant to include all of environments in which multimedia content and their descriptions are transmitted from one system to another and across different types of communication media. Therefore, it is manifestly intended that this invention be limited only by the following claims and equivalents thereof.

What is claimed is:

1. A computerized method for encoding an instance document representing a content description, the method comprising:
    determining a context node from a plurality of context nodes in the content description, the plurality of context nodes corresponding to description schemes for a particular multimedia content described by the instance document, wherein the plurality of context nodes are represented in the encoded instance document as a plurality of data structures;
    obtaining a schema associated with the context node, the schema defining required attributes, optional attributes, required elements, and optional elements for the context node, with the optional attributes and optional elements having an order;
    creating a required attributes section containing a value for each required attribute for the context node;
    creating an optional attributes section containing a value for each optional attribute for the context node that appears in the content description;
    creating a required elements section containing a value for each required element for the context node;
    creating an optional elements section containing a value for each optional element for the context node that appears in the content description; and
    generating the encoded instance document comprising the attributes and elements sections defined by the schema for each of the plurality of context nodes and a context-node reset code specifying an address for a next context node in the content description for each context node except a last context node, wherein the encoded instance document is a compressed representation of the instance document.

2. The computerized method of claim 1, wherein creating the optional attributes section comprises:
    including a mask in a header of the optional attributes section, the mask indicating which of the optional attributes defined in the schema are present in the content description.

3. The computerized method of claim 2, wherein creating the optional attributes section further comprises:
    including an order field in the header of the optional attributes section, the order field indicating that the optional attributes present in the content description correspond to the order of the optional attributes in the schema.

4. The computerized method of claim 1, wherein creating the optional attributes section comprises:
    including an order field in a header of the optional attributes section, the order field indicating that the optional attributes present in the content do not correspond to the order of the optional attributes in the schema;
    including a number field in the header of the optional attributes section, the number field indicating a count of the optional attributes present in the content description; and
    associating an attribute identifier with the value of each optional attribute present in the content description.

5. The computerized method of claim 1, wherein creating the required elements section comprises:

associating an element identifier with the value for a required element if the schema defines a choice of values for the corresponding required element.

6. The computerized method of claim 1, wherein creating the required elements section comprises
including a terminator field for a required element in the required elements section if the schema defines the corresponding required element as an unbounded sequence.

7. The computerized method of claim 1, wherein creating the optional elements section comprises:
including a mask in a header of the optional elements section, the mask indicating which of the optional elements defined in the schema are present in the content description.

8. The computerized method of claim 7, wherein creating the optional elements section further comprises:
including an order field in the header of the optional elements section, the order field indicating the optional elements present in the content description correspond to the order of the optional elements in the schema.

9. The computerized method of claim 7, wherein creating the optional elements section further comprises:
associating a repeat field with the value of an optional element if the schema defines the corresponding optional element as having multiple occurrences.

10. The computerized method of claim 1, wherein creating the optional elements section comprises:
including an order field in a header of the optional elements section, the order field indicating that the optional elements present in the content do not correspond to the order of the optional elements in the schema;
including a number field in the header of the optional elements section, the number field indicating a count of the optional elements present in the content description; and
associating an element identifier with the value of each optional element present in the content description.

11. The computerized method of claim 10, wherein creating the optional elements section further comprises:
associating a repeat field with each value of an optional element if the schema defines the corresponding optional element as having multiple occurrences; and
associating the element identifier with only one value of the optional element if the schema defines the corresponding optional element as having multiple occurrences.

12. The computerized method of claim 1, wherein creating the required attributes section comprises:
associating an element identifier with the value of each required attribute.

13. The computerized method of claim 1, wherein creating the optional attributes section comprises:
associating an attribute identifier with the value of each optional attribute present in the content.

14. The computerized method of claim 1, wherein creating the required elements section comprises:
associating an element identifier with the value of each required element.

15. The computerized method of claim 14, wherein creating the required elements section further comprises:
including a terminator field for a required element in the required elements section if the schema defines the corresponding required element as an unbounded sequence.

16. The computerized method of claim 1, wherein creating the optional elements section comprises:
associating an element identifier with the value of each optional element present in the content description.

17. The computerized method of claim 16, wherein creating the optional elements section further comprises:
associating a repeat field with each value of an optional element if the schema defines the corresponding optional element as having multiple occurrences; and
associating the element identifier with only one value of the optional element if the schema defines the corresponding optional element as having multiple occurrences.

18. The computerized method of claim 1 further comprising:
creating the context-node reset code.

19. A computer-readable storage medium having executable instructions to cause a computer to perform a method comprising:
determining a context node from a plurality of context nodes in a content description, the plurality of context nodes corresponding to description schemes for a particular multimedia content described by an instance document, wherein the plurality of context nodes are represented in the encoded instance document as a plurality of data structures;
obtaining a schema associated with the context node, the schema defining required attributes, optional attributes, required elements, and optional elements for the context node, with the optional attributes and optional elements having an order;
creating a required attributes section containing a value for each required attribute for the context node;
creating an optional attributes section containing a value for each optional attribute for the context node that appears in the content description;
creating a required elements section containing a value for each required element for the context node;
creating an optional elements section containing a value for each optional element for the context node that appears in the content description; and
generating the encoded instance document comprising the attributes and elements sections defined by the schema for each of the plurality of context nodes and a context-node reset code specifying an address for a next context node in the content description for each context node except a last context node, wherein the encoded instance document is a compressed representation of the instance document.

20. The computer-readable medium of claim 19, wherein creating the optional attributes section comprises:
including a mask in a header of the optional attributes section, the mask indicating which of the optional attributes defined in the schema are present in the content description.

21. The computer-readable medium of claim 20, wherein creating the optional attributes section further comprises:
including an order field in the header of the optional attributes section, the order field indicating that the optional attributes present in the content description correspond to the order of the optional attributes in the schema.

22. The computer-readable medium of claim 19, wherein creating the optional attributes section comprises:
including an order field in a header of the optional attributes section, the order field indicating that the optional attributes present in the content do not correspond to the order of the optional attributes in the schema;

including a number field in the header of the optional attributes section, the number field indicating a count of the optional attributes present in the content description; and associating an attribute identifier with the value of each optional attribute present in the content description.

23. The computer-readable medium of claim 19, wherein creating the required elements section comprises:

associating an element identifier with the value for a required element if the schema defines a choice of values for the corresponding required element.

24. The computer-readable medium of claim 19, wherein creating the required elements section comprises including a terminator field for a required element in the required elements section if the schema defines the corresponding required element as an unbounded sequence.

25. The computer-readable medium of claim 19, wherein creating the optional elements section comprises:

including a mask in a header of the optional elements section, the mask indicating which of the optional elements defined in the schema are present in the content description.

26. The computer-readable medium of claim 25, wherein creating the optional elements section further comprises:

including an order field in the header of the optional elements section, the order field indicating that the optional elements present in the content description correspond to the order of the optional elements in the schema.

27. The computer-readable medium of claim 25, wherein creating the optional elements section further comprises:

associating a repeat field with the value of an optional element if the schema defines the corresponding optional element as having multiple occurrences.

28. The computer-readable medium of claim 19, wherein creating the optional elements section comprises:

including an order field in a header of the optional elements section, the order field indicating that the optional elements present in the content do not correspond to the order of the optional elements in the schema;

including a number field in the header of the optional elements section, the number field indicating a count of the optional elements present in the content description; and associating an element identifier with the value of each optional element present in the content description.

29. The computer-readable medium of claim 28, wherein creating the optional elements section further comprises:

associating a repeat field with each value of an optional element if the schema defines the corresponding optional element as having multiple occurrences; and associating the element identifier with only one value of the optional element if the schema defines the corresponding optional element as having multiple occurrences.

30. The computer-readable medium of claim 19, wherein creating the required attributes section comprises:

associating an element identifier with the value of each required attribute.

31. The computer-readable medium of claim 19, wherein creating the optional attributes section comprises:

associating an attribute identifier with the value of each optional attribute present in the content.

32. The computer-readable medium of claim 19, wherein creating the required elements section comprises:

associating an element identifier with the value of each required element.

33. The computer-readable medium of claim 32, wherein creating the required elements section further comprises:

including a terminator field for a required element in the required elements section if the schema defines the corresponding required element as an unbounded sequence.

34. The computer-readable medium of claim 19, wherein creating the optional elements section comprises:

associating an element identifier with the value of each optional element present in the content description.

35. The computer-readable medium of claim 34, wherein creating the optional elements section further comprises:

associating a repeat field with each value of an optional element if the schema defines the corresponding optional element as having multiple occurrences; and associating the element identifier with only one value of the optional element if the schema defines the corresponding optional element as having multiple occurrences.

36. The computer-readable medium of claim 19, wherein the method further comprises:

creating the context-node reset code.

37. A system comprising:

a processor coupled to a bus;

a memory coupled to the processor through the bus; and an encode process executed by the processor from the memory to cause the processor to determine a context node from a plurality of context nodes in a content description, the plurality of context nodes corresponding to description schemes for a particular multimedia content described by an instance document, wherein the plurality of context nodes are represented in the encoded instance document as a plurality of data structures, obtain a schema associated with the context node, the schema defining required attributes, optional attributes, required elements, and optional elements for the context node, with the optional attributes and optional elements having an order, create a required attributes section containing a value for each required attribute for the context node, create an optional attributes section containing a value for each optional attribute for the context node that appears in the content description, create a required elements section containing a value for each required element for the context node, create an optional elements section containing a value for each optional element for the context node that appears in the content description, and generate the encoded instance document comprising the attributes and elements sections defined by the schema for each of the plurality of context nodes and a context-node reset code specifying an address for a next context node in the content description for each context node except a last context node, wherein the encoded instance document is a compressed representation of the instance document.

38. The system of claim 37, wherein the encode process further causes the processor, when creating the optional attributes section, to include a mask in a header of the optional attributes section, the mask indicating which of the optional attributes defined in the schema are present in the content description.

39. The system of claim 38, wherein the encode process further causes the processor, when creating the optional attributes section, to include an order field in the header of the optional attributes section, the order field indicating that the optional attributes present in the content description correspond to the order of the optional attributes in the schema.

40. The system of claim 37, wherein the encode process further causes the processor, when creating the optional attributes section, to
include an order field in a header of the optional attributes section, the order field indicating that the optional attributes present in the content do not correspond to the order of the optional attributes in the schema,
include a number field in the header of the optional attributes section, the number field indicating a count of the optional attributes present in the content description, and
associate an attribute identifier with the value of each optional attribute present in the content description.

41. The system of claim 37, wherein the encode process further causes the processor, when creating the required elements section, to associate an element identifier with the value for a required element if the schema defines a choice of values for the corresponding required element.

42. The system of claim 37, wherein the encode process further causes the processor, when creating the required elements section, to include a terminator field for a required element in the required elements section if the schema defines the corresponding required element as an unbounded sequence.

43. The system of claim 37, wherein the encode process further causes the processor, when creating the optional elements section, to include a mask in a header of the optional elements section, the mask indicating which of the optional elements defined in the schema are present in the content description.

44. The system of claim 43, wherein the encode process further causes the processor, when creating the optional elements section, to include an order field in the header of the optional elements section, the order field indicating that the optional elements present in the content description correspond to the order of the optional elements in the schema.

45. The system of claim 43, wherein the encode process further causes the processor, when creating the optional elements section, to associate a repeat field with the value of an optional element if the schema defines the corresponding optional element as having multiple occurrences.

46. The system of claim 37, wherein the encode process further causes the processor, when creating the optional elements section to
include an order field in a header of the optional elements section, the order field indicating that the optional elements present in the content do not correspond to the order of the optional elements in the schema,
include a number field in the header of the optional elements section, the number field indicating a count of the optional elements present in the content description, and
associate an element identifier with the value of each optional element present in the content description.

47. The system of claim 46, wherein the encode process further causes the processor, when creating the optional elements section, to
associate a repeat field with each value of an optional element if the schema defines the corresponding optional element as having multiple occurrences, and
associate the element identifier with only one value of the optional element if the schema defines the corresponding optional element as having multiple occurrences.

48. The system of claim 37, wherein the encode process further causes the processor, when creating the required attributes section, to associate an element identifier with the value of each required attribute.

49. The system of claim 37, wherein the encode process further causes the processor, when creating the optional attributes section, to associate an attribute identifier with the value of each optional attribute present in the content.

50. The system of claim 37, wherein the encode process further causes the processor, when creating the required elements section, to associate an element identifier with the value of each required element.

51. The system of claim 50, wherein the encode process further causes the processor, when creating the required elements section, to include a terminator field for a required element in the required elements section if the schema defines the corresponding required element as an unbounded sequence.

52. The system of claim 37, wherein the encode process further causes the processor, when creating the optional elements section, to associate an element identifier with the value of each optional element present in the content description.

53. The system of claim 52, wherein the encode process further causes the processor, when creating the optional elements section, to
associate a repeat field with each value of an optional element if the schema defines the corresponding optional element as have multiple occurrences, and
associate the element identifier with only one value of the optional element if the schema defines the corresponding optional element as have multiple occurrences.

54. The system of claim 37, wherein the encode process further causes the processor to create the context-node reset code.

55. A computerized method for decoding an encoded instance document representing a content description, the method comprising:
obtaining a schema associated with a context node in the instance document, the context node being one of a plurality of context nodes corresponding to description schemes for a particular multimedia content described by the instance document, the schema defining required attributes, optional attributes, required elements, and optional elements for the context node, with the optional attributes and optional elements having an order, wherein the plurality of context nodes are represented in the encoded instance document as a plurality of data structures, and wherein the encoded instance document is a compressed representation of the instance document comprising the attributes and elements sections defined by the schema for each of the plurality of context nodes and a context-node reset code specifying an address for a next context node in the content description for each context node except a last context node;
extracting a value for each required attribute from a required attributes section when present in the encoded instance document;
extracting a value for each optional attribute that appears in the content description from an optional attributes section when present in the encoded instance document;
extracting a value for each required element from a required elements section when present in the encoded instance document;
extracting a value for each optional element that appears in the content description from an optional elements section when present in the encoded instance document, and
generating the instance document from the values extracted from the compressed representation of the instance document.

56. The computerized method of claim 55, wherein extracting from the optional attributes section comprises:
  extracting a mask from a header of the optional attributes section, the mask indicating which of the optional attributes defined in the schema are present in the content description.

57. The computerized method of claim 56, wherein extracting from the optional attributes section further comprises:
  extracting an order field from the header of the optional attributes section, the order field indicating that the optional attributes present in the content description correspond to the order of the optional attributes in the schema.

58. The computerized method of claim 55, wherein extracting from the optional attributes section comprises:
  extracting an order field from a header of the optional attributes section, the order field indicating that the optional attributes present in the content description do not correspond to the order of the optional attributes in the schema;
  extracting a number field from the header of the optional attributes section, the number field indicating a count of the optional attributes present in the content description; and
  extracting an attribute identifier associated with the value of each optional attribute present in the content description.

59. The computerized method of claim 55, wherein extracting from the required elements section comprises:
  extracting an element identifier associated with the value of a required element if the schema defines a choice of values for the corresponding required element.

60. The computerized method of claim 55, wherein extracting from the required elements section comprises:
  extracting a terminator field for a required element in the required elements section if the schema defines the corresponding required element as an unbounded sequence.

61. The computerized method of claim 55, wherein extracting from the optional elements section comprises:
  extracting a mask from a header of the optional elements section, the mask indicating which of the optional elements defined in the schema are present in the content description.

62. The computerized method of claim 61, wherein extracting from the optional elements section further comprises:
  extracting an order field from the header of the optional elements section, the order field indicating that the optional elements present in the content description correspond to the order of the optional elements in the schema.

63. The computerized method of claim 61, wherein extracting from the optional elements section further comprises:
  extracting a repeat field associated with the value of an optional element if the schema defines the corresponding optional element as having multiple occurrences.

64. The computerized method of claim 55, wherein extracting from the optional elements section comprises:
  extracting an order field from a header of the optional elements section, the order field indicating that the optional elements present in the content do not correspond to the order of the optional elements in the schema;
  extracting a number field from the header of the optional elements section, the number field indicating a count of the optional elements present in the content description; and
  extracting an element identifier associated with the value of each optional element present in the content description.

65. The computerized method of claim 64, wherein extracting from the optional elements section further comprises:
  extracting a repeat field associated with the value of an optional element if the schema defines the corresponding optional element as having multiple occurrences; and
  extracting the element identifier associated with only one value of the optional element if the schema defines the corresponding optional element as having multiple occurrences.

66. The computerized method of claim 55, wherein extracting from the required attributes section comprises:
  extracting an element identifier associated with the value of each required attribute.

67. The computerized method of claim 55, wherein extracting from the optional attributes section comprises:
  extracting an attribute identifier associated with the value of each optional attribute present in the content.

68. The computerized method of claim 55, wherein extracting from the required elements section comprises:
  extracting an element identifier associated with the value of each required element.

69. The computerized method of 68, wherein extracting from the required elements section further comprises:
  extracting a terminator field for a required element in the required elements section if the schema defines the corresponding required element as an unbounded sequence.

70. The computerized method of claim 55, wherein extracting the optional elements section comprises:
  extracting an element identifier associated with the value of each optional element present in the content description.

71. The computerized method of claim 70, wherein extracting from the optional elements section further comprises:
  extracting a repeat field associated with each value of an optional element if the schema defines the corresponding optional element as having multiple occurrences; and
  extracting the element identifier associated with only one value of the optional element if the schema defines the corresponding optional element as having multiple occurrences.

72. The computerized method of claim 55 further comprising:
  extracting the context-node reset code.

73. A computer-readable storage medium having executable instructions to cause a computer to perform a method comprising:
  obtaining a schema associated with a context node in an instance document, the context node corresponding to a description scheme for a particular multimedia content described by an instance document, the schema defining required attributes, optional attributes, required elements, and optional elements for the context node, with the optional attributes and optional elements having an order, wherein the plurality of context nodes are represented in the encoded instance document as a plurality of data structures, and wherein the encoded instance document is a compressed representation of the instance document comprising the attributes and elements sections defined by the schema for each of the plurality of context nodes and a context-node reset code specifying an address for a next context node in the content description for each context node except a last context node;

extracting a value for each required attribute from a required attributes section when present in the encoded instance document;

extracting a value for each optional attribute that appears in the content description from an optional attributes section when present in the encoded instance document;

extracting a value for each required element from a required elements section when present in the encoded instance document;

extracting a value for each optional element that appears in the content description from an optional elements section when present in the encoded instance document; and generating the instance document from the values extracted from the compressed representation of the instance document.

74. The computer-readable medium of claim 73, wherein extracting from the optional attributes section comprises:

extracting a mask from a header of the optional attributes section, the mask indicating which of the optional attributes defined in the schema are present in the content description.

75. The computer-readable medium of claim 74, wherein extracting from the optional attributes section further comprises:

extracting an order field from the header of the optional attributes section, the order field indicating that the optional attributes present in the content description correspond to the order of the optional attributes in the schema.

76. The computer-readable medium of claim 73, wherein extracting from the optional attributes section comprises:

extracting an order field from a header of the optional attributes section, the order field indicating that the optional attributes present in the content description do not correspond to the order of the optional attributes in the schema;

extracting a number field from the header of the optional attributes section, the number field indicating a count of the optional attributes present in the content description; and extracting an attribute identifier associated with the value of each optional attribute present in the content description.

77. The computer-readable medium of claim 73, wherein extracting from the required elements section comprises:

extracting an element identifier associated with the value of a required element if the schema defines a choice of values for the corresponding required element.

78. The computer-readable medium of claim 73, wherein extracting from the required elements section comprises extracting a terminator field for a required element in the required elements section if the schema defines the corresponding required element as an unbounded sequence.

79. The computer-readable medium of claim 73, wherein extracting from the optional elements section comprises:

extracting a mask from a header of the optional elements section, the mask indicating which of the optional elements defined in the schema are present in the content description.

80. The computer-readable medium of claim 79, wherein extracting from the optional elements section further comprises:

extracting an order field from the header of the optional elements section, the order field indicating that the optional elements present in the content description correspond to the order of the optional elements in the schema.

81. The computer-readable medium of claim 79, wherein extracting from the optional elements section further comprises:

extracting a repeat field associated with the value of an optional element if the schema defines the corresponding optional element as having multiple occurrences.

82. The computer-readable medium of claim 73, wherein extracting from the optional elements section comprises:

extracting an order field from a header of the optional elements section, the order field indicating that the optional elements present in the content do not correspond to the order of the optional elements in the schema;

extracting a number field from the header of the optional elements section, the number field indicating a count of the optional elements present in the content description; and extracting an element identifier associated with the value of each optional element present in the content description.

83. The computer-readable medium of claim 82, wherein extracting from the optional elements section further comprises:

extracting a repeat field associated with the value of an optional element if the schema defines the corresponding optional element as having multiple occurrences; and extracting the element identifier associated with only one value of the optional element if the schema defines the corresponding optional element as having multiple occurrences.

84. The computer-readable medium of claim 73, wherein extracting from the required attributes section comprises:

extracting an element identifier associated with the value of each required attribute.

85. The computer-readable medium of claim 73, wherein extracting from the optional attributes section comprises:

extracting an attribute identifier associated with the value of each optional attribute present in the content.

86. The computer-readable medium of claim 73, wherein extracting from the required elements section comprises:

extracting an element identifier associated with the value of each required element.

87. The computer-readable medium of claim 86, wherein extracting from the required elements section further comprises:

extracting a terminator field for a required element in the required elements section if the schema defines the corresponding required element as an unbounded sequence.

88. The computer-readable medium of claim 73, wherein extracting the optional elements section comprises:

extracting an element identifier associated with the value of each optional element present in the content description.

89. The computer-readable medium of claim 88, wherein extracting from the optional elements section further comprises:

extracting a repeat field associated with each value of an optional element if the schema defines the corresponding optional element as having multiple occurrences; and extracting the element identifier associated with only one value of the optional element if the schema defines the corresponding optional element as having multiple occurrences.

90. The computer-readable medium of claim 73 further comprising:
extracting the context-node reset code, the context-node reset code specifying a different context node in the content description.

91. A system comprising;
a processor coupled to a bus;
a memory coupled to the processor through the bus; and
a decode process for an encoded instance document representing a content description, the decode process executed by the processor from the memory to cause the processor to
obtain a schema associated with a context node in the instance document, the context node being one of a plurality of context nodes corresponding to description scheme for a particular multimedia content described by an instance document, the schema defining required attributes, optional attributes, required elements, and optional elements for the context node, with the optional attributes and optional elements having an order, wherein the plurality of context nodes are represented in the encoded instance document as a plurality of data structures, and wherein the encoded instance document is a compressed representation of the instance document comprising the attributes and elements sections defined by the schema for each of the plurality of context nodes and a context-node reset code specifying an address for a next context node in the content description for each context node except a last context node,
extract a value for each required attribute from a required attributes section when present in the encoded instance document,
extract a value for each optional attribute that appears in the content description from an optional attributes section when present in the encoded instance document,
extract a value for each required element from a required elements section when present in the encoded instance document,
extract a value for each optional element that appears in the content description from an optional elements section when present in the encoded instance document; and
generate the instance document from the values extracted from the compressed representation of the instance document.

92. The system of claim 91, wherein the decode process further causes the processor, when extracting from the optional attributes section, to extract a mask from a header of the optional attributes section, the mask indicating which of the optional attributes defined in the schema are present in the content description.

93. The system of claim 92, wherein the decode process further causes the processor, when extracting from the optional attributes section, to extract an order field from the header of the optional attributes section, the order field indicating that the optional attributes present in the content description correspond to the order of the optional attributes in the schema.

94. The system of claim 91, wherein the decode process further causes the processor, when extracting from the optional attributes section, to
extract an order field from a header of the optional attributes section, the order field indicating that the optional attributes present in the content description do not correspond to the order of the optional attributes in the schema,
extract a number field from the header of the optional attributes section, the number field indicating a count of the optional attributes present in the content description, and
extract an attribute identifier associated with the value of each optional attribute present in the content description.

95. The system of claim 91, wherein the decode process further causes the processor, when extracting from the required elements section, to extract an element identifier associated with the value of a required element if the schema defines a choice of values for the corresponding required element.

96. The system of claim 91, wherein the decode process further causes the processor, when extracting from the required elements section, to extract a terminator field for a required element in the required elements section if the schema defines the corresponding required element as an unbounded sequence.

97. The system of claim 91, wherein the decode process further causes the processor, when extracting from the optional elements section, to extract a mask from a header of the optional elements section, the mask indicating which of the optional elements defined in the schema are present in the content description.

98. The system of claim 97, wherein the decode process further causes the processor, when extracting from the optional elements section, to extract an order field from the header of the optional elements section, the order field indicating that the optional elements present in the content description correspond to the order of the optional elements in the schema.

99. The system of claim 97, wherein the decode process further causes the processor, when extracting from the optional elements section, to extract a repeat field associated with the value of an optional element if the schema defines the corresponding optional element as having multiple occurrences.

100. The system of claim 91, wherein the decode process further causes the processor, when extracting from the optional elements section, to
extract an order field from a header of the optional elements section, the order field indicating that the optional elements present in the content do not correspond to the order of the optional elements in the schema,
extract a number field from the header of the optional elements section, the number field indicating a count of the optional elements present in the content description, and
extract an element identifier associated with the value of each optional element present in the content description.

101. The system of claim 100, wherein the decode process further causes the processor, when extracting from the optional elements section, to
extract a repeat field associated with the value of an optional element if the schema defines the corresponding optional element as having multiple occurrences, and
extract the element identifier associated with only one value of the optional element if the schema defines the corresponding optional element as having multiple occurrences.

102. The system of claim 91, wherein the decode process further causes the processor, when extracting from the required attributes section, to extract an element identifier associated with the value of each required attribute.

103. The system of claim 91, wherein the decode process further causes the processor, when extracting from the optional attributes section, to extract an attribute identifier associated with the value of each optional attribute present in the content.

104. The system of claim 91, wherein the decode process further causes the processor, when extracting from the required elements section, to extract an element identifier associated with the value of each required element.

105. The system of claim 104, wherein the decode process further causes the processor, when extracting from the required elements section, to extract a terminator field for a required element in the required elements section if the schema defines the corresponding required element as an unbounded sequence.

106. The system of claim 91, wherein the decode process further causes the processor, when extracting from the optional elements section, to extract an element identifier associated with the value of each optional element present in the content description.

107. The system of claim 106, wherein the decode process further causes the processor, when extracting from the optional elements section, to extract a repeat field associated with each value of an optional element if the schema defines the corresponding optional element as having multiple occurrences, and extract the element identifier associated with only one value of the optional element if the schema defines the corresponding optional element as having multiple occurrences.

108. The system of claim 91 wherein the decode process further causes the processor to extract the context-node reset code.

* * * * *